United States Patent
Lee et al.

(10) Patent No.: US 9,927,973 B2
(45) Date of Patent: Mar. 27, 2018

(54) ELECTRONIC DEVICE FOR EXECUTING AT LEAST ONE APPLICATION AND METHOD OF CONTROLLING SAID ELECTRONIC DEVICE

(71) Applicant: Samsung Electronics Co., Ltd., Suwon-Si, Gyeonggi-Do (KR)

(72) Inventors: HyunJeong Lee, Hwaseong-si (KR); Joonah Park, Seoul (KR); SungJoo Suh, Seoul (KR); SeungJu Han, Seoul (KR); JaeJoon Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 62 days.

(21) Appl. No.: 14/561,660

(22) Filed: Dec. 5, 2014

(65) Prior Publication Data

US 2015/0227236 A1    Aug. 13, 2015

(30) Foreign Application Priority Data

Feb. 12, 2014  (KR) .................. 10-2014-0015925

(51) Int. Cl.
| | |
|---|---|
| *G06F 3/0488* | (2013.01) |
| *G06F 3/01* | (2006.01) |
| *G06F 3/0481* | (2013.01) |
| *G06F 9/44* | (2018.01) |

(52) U.S. Cl.
CPC ........ *G06F 3/04886* (2013.01); *G06F 3/013* (2013.01); *G06F 3/0481* (2013.01); *G06F 3/04883* (2013.01); *G06F 9/4443* (2013.01); *G06F 2203/04803* (2013.01); *G06F 2203/04806* (2013.01); *G06F 2203/04808* (2013.01)

(58) Field of Classification Search
CPC .......... G06F 9/44; G06F 3/013; G06F 3/0481; G06F 3/04886; G06F 3/04883
See application file for complete search history.

(56) References Cited

U.S. PATENT DOCUMENTS

| | | | |
|---|---|---|---|
| 7,827,029 B2 | 11/2010 | Kaplan et al. | |
| 8,049,734 B2 | 11/2011 | Rosenberg et al. | |
| RE43,082 E | 1/2012 | Gutowitz | |
| 8,448,095 B1 | 5/2013 | Haussila et al. | |
| 8,451,248 B1 | 5/2013 | Kim | |
| 2007/0195047 A1* | 8/2007 | Cho | G09G 3/3648 345/98 |
| 2012/0032893 A1* | 2/2012 | Calpe Maravilla | G06F 3/045 345/173 |
| 2012/0050273 A1 | 3/2012 | Yoo et al. | |
| 2012/0212510 A1 | 8/2012 | Hewitt et al. | |
| 2012/0280908 A1 | 11/2012 | Rhoads et al. | |

(Continued)

FOREIGN PATENT DOCUMENTS

| | | |
|---|---|---|
| KR | 2009-0038413 A | 4/2009 |
| KR | 2012-0046272 A | 5/2012 |

(Continued)

*Primary Examiner* — Shaheda Abdin
(74) *Attorney, Agent, or Firm* — Harness, Dickey & Pierce, P.L.C.

(57) ABSTRACT

Methods and systems of controlling an electronic device that executes at least one application include receiving a multipoint input; detecting input points of the multipoint input; and generating a layer for executing the at least one application based on the detected input points of the multipoint input.

20 Claims, 35 Drawing Sheets

(56) References Cited

U.S. PATENT DOCUMENTS

| | | | |
|---|---|---|---|
| 2012/0327006 A1* | 12/2012 | Israr | G06F 3/044 |
| | | | 345/173 |
| 2013/0016045 A1 | 1/2013 | Zhao et al. | |
| 2013/0088518 A1 | 4/2013 | Lemmey et al. | |
| 2014/0033117 A1* | 1/2014 | Kim | G06F 3/04845 |
| | | | 715/796 |

FOREIGN PATENT DOCUMENTS

| | | |
|---|---|---|
| KR | 1199970 A | 5/2012 |
| KR | 2012-0063328 A | 6/2012 |
| KR | 2012-0091783 A | 8/2012 |
| KR | 1289527 B1 | 7/2013 |
| WO | WO-2012/003799 A1 | 1/2012 |

* cited by examiner

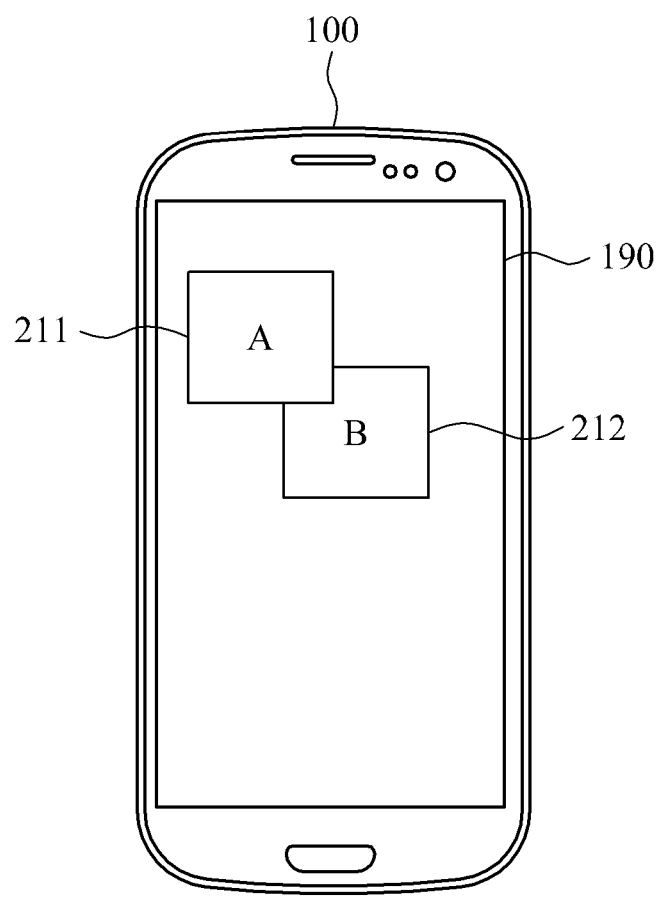

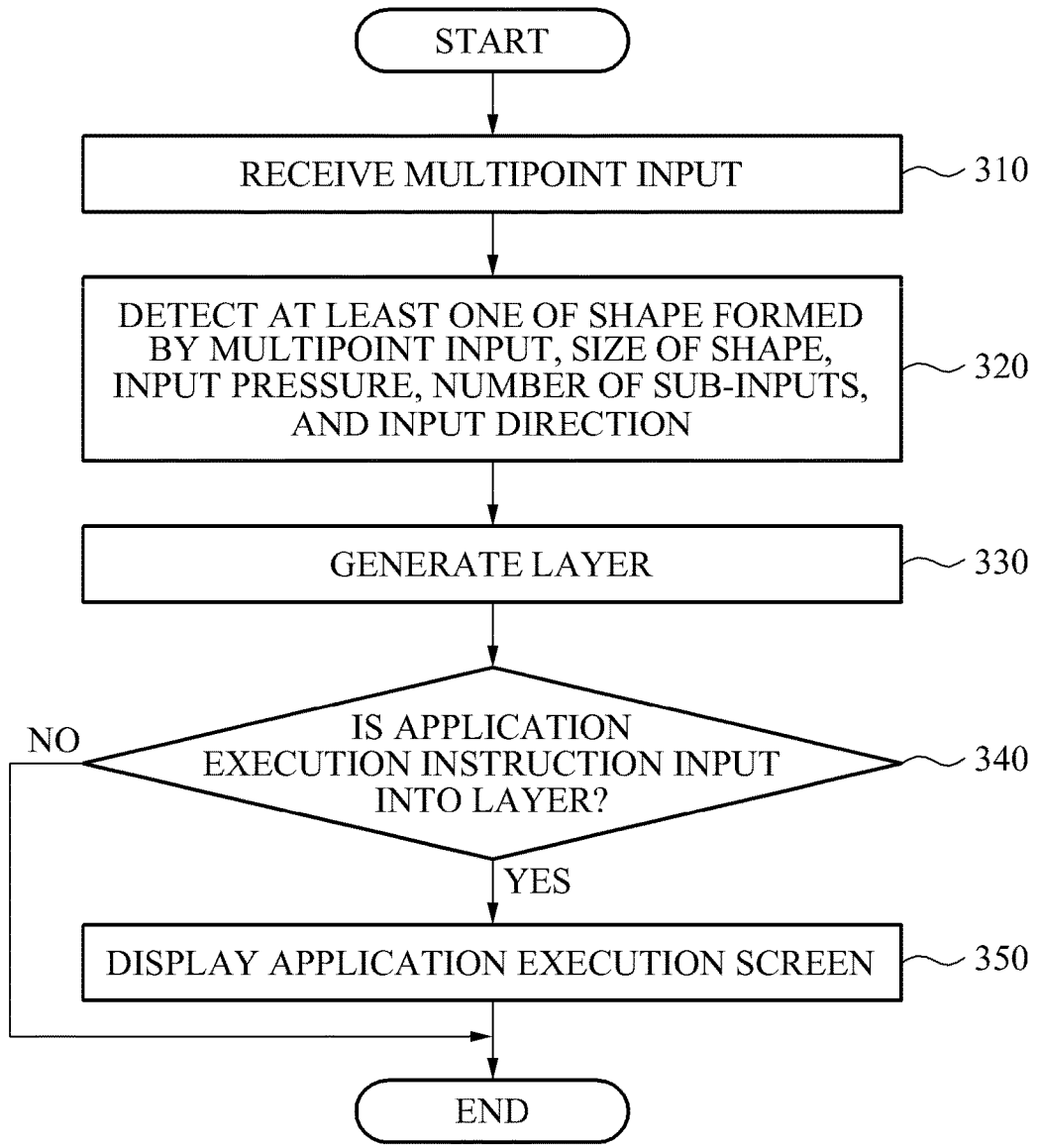

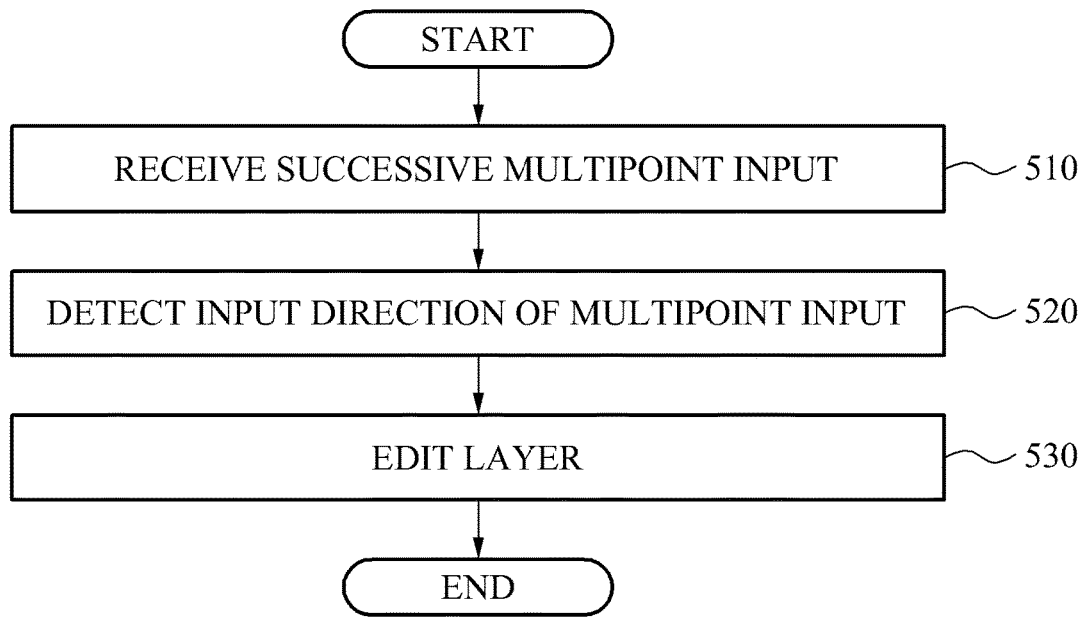

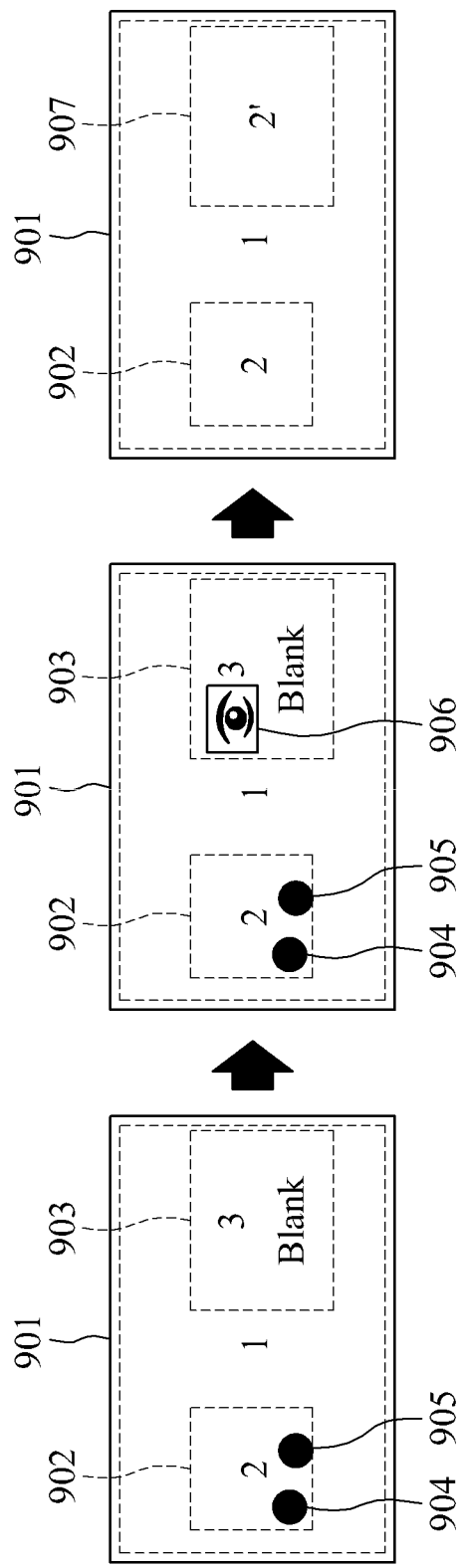

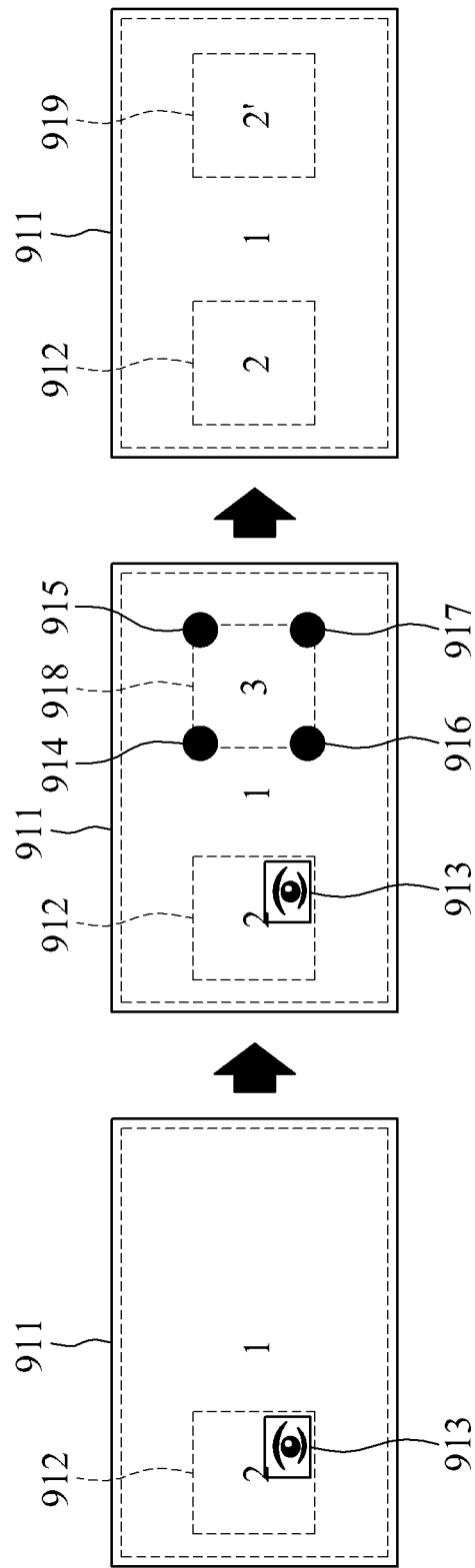

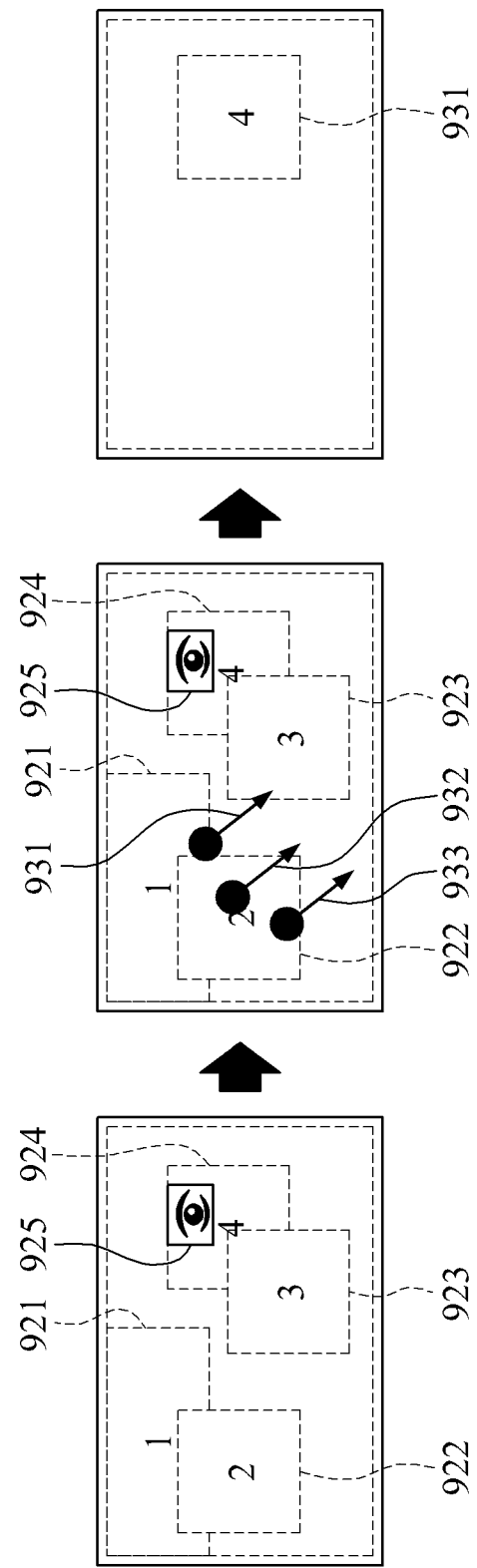

ELECTRONIC DEVICE FOR EXECUTING AT LEAST ONE APPLICATION AND METHOD OF CONTROLLING SAID ELECTRONIC DEVICE

CROSS-REFERENCE TO RELATED APPLICATION

This application claims the priority benefit of Korean Patent Application No. 10-2014-0015925, filed on Feb. 12, 2014, in the Korean Intellectual Property Office, the disclosure of which is incorporated herein by reference in its entirety.

BACKGROUND

1. Field

Example embodiments relate to an electronic device for executing at least one application and a method of controlling the electronic device, and more particularly, to an electronic device for executing at least one application to be controlled based on a multipoint input and a method of controlling the electronic device.

2. Description of the Related Art

A desktop computer includes at least one display device, for example, a monitor, whereas a touchscreen mobile device, for example, a mobile phone, a smart phone, and a tablet personal computer (PC), includes a single display device.

A user of a desktop computer may split a screen of a display device based on a working environment. A split refers to a method of working with a plurality of layers being displayed, and may include a horizontal split and a vertical split. When a web browser is executed, a web page may be scrolled through using a Page Up key or a Page Down key on a keyboard. When a mouse is used in lieu of a keyboard, the web page may be scrolled through by clicking on and dragging a scrollbar on an edge of the web page using a mouse cursor. In addition, the web page may be scrolled up to the top by clicking a scroll-to-top button displayed using an icon or a text at a lower portion of the web page.

A mobile device has a relatively small screen, when compared to a desktop computer and thus, input restrictions may exist. Additionally, splitting the screen of the mobile device may be difficult. Although technology that displays a plurality of applications on a screen of a mobile device has been introduced development of a more intuitive editing method is desired to display a plurality of applications on a size-restricted display of a mobile device.

SUMMARY

At least one example embodiment relates to a method of controlling an electronic device that executes at least one application.

According to an example embodiment, a method of controlling an electronic device that executes at least one application includes receiving, by the electronic device, a first multipoint input; detecting, by the electronic device, input points of the first multipoint input; and generating, by the electronic device, a first layer to execute a first application, the first layer being based on the detected input points of the first multipoint input.

Example embodiments provide that the detecting includes detecting at least one of (i) a shape formed by the input points of the first multipoint input and (ii) a size of the shape.

Example embodiments provide that the editing includes editing the first layer to execute the first application based on the detecting; and generating a new layer based on the editing.

Example embodiments provide that the editing includes generating a new layer with a boundary, the boundary being based on the input points of the multipoint input.

Example embodiments provide that the editing includes displaying a ghost view for previewing a shape of a new layer with a boundary, the boundary being based on the input points of the multipoint input; receiving an instruction to generate the new layer; and generating the new layer corresponding to the ghost view when the instruction to generate the new layer is input.

Example embodiments provide that the method further includes displaying the ghost view when the first multipoint input is maintained; and generating the new layer corresponding to the ghost view when at least one of (i) the multipoint input is completed, (ii) a pressure of the multipoint input is changed, and (iii) the pressure of the multipoint input is changed from a first pressure to a second pressure.

Example embodiments provide that the method further comprises receiving an instruction to execute the first application in the new layer; and executing the first application in the new layer in accordance with the instruction.

Example embodiments provide that the method further comprises providing a recommendation for executing at least one application in the new layer, based on at least one of (i) an application type of the at least one application, (ii) a shape of the new layer, (iii) a size of the new layer, and (iv) an aspect ratio of the new layer.

Example embodiments provide that the electronic device includes at least one existing layer currently being displayed by the electronic device, and the editing includes deleting the at least one existing layer.

Example embodiments provide that the method further includes receiving the first multipoint input on or within a boundary of the at least one existing layer; and deleting the at least one existing layer corresponding to the first multipoint input.

Example embodiments provide that the electronic device includes at least one existing layer currently being displayed by the electronic device, and the editing includes changing at least one of (i) a location and (ii) a size of the at least one existing layer.

Example embodiments provide that the method further includes receiving a multipoint input in the first layer for executing the first application; receiving a second multipoint input; generating a second layer for executing the first application at a receiving location of the second multipoint input; and providing the second layer including executing the first application within the second layer.

Example embodiments provide that the method further includes receiving a first sub-multipoint input while a multipoint input for executing the first application is being received in the first layer; receiving a second sub-multipoint input while another multipoint input for executing a second application is being received in a second layer; executing the second application in the first layer; and executing the first application in the second layer.

Example embodiments provide that the method further includes receiving a spatially successive input, the spatially successive input being a multipoint input including a plurality of input points that are relatively proximate to one another; detecting an input direction of the spatially successive input; and editing the first layer based on the input direction of the spatially successive input.

Example embodiments provide that the method further includes detecting a user gaze; determining a direction of the user gaze; and editing the first layer based on the input points of the first multipoint input and the direction of the user gaze.

Example embodiments provide that the method further includes executing the first application in a second layer when (i) the input points of the first multipoint input correspond to an instruction to execute the first application in the layer and (ii) the direction of the user gaze corresponds to the second layer.

Example embodiments provide that the method further includes generating a second layer; and executing the first application in the second layer based on the first multipoint input when the direction of the user gaze corresponds to the first layer and the input points of the first multipoint input correspond to an area that does not include a layer.

Example embodiments provide that the method further includes displaying the first layer when the direction of the user gaze corresponds to the first layer and the multipoint input corresponds to a flick gesture.

Example embodiments provide that the method further includes detecting an input pressure of the first multipoint input; and editing the first layer based on the detected input pressure.

At least one example embodiment relates to an electronic device for executing at least one application.

According to an example embodiment, an electronic device for executing at least one application includes an input unit configured to receive a multipoint input; a motion recognizer configured to detect input points of the multipoint input; and a controller configured to edit a layer for executing the at least one application based on the detected input points of the multipoint input.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 2A and 2B illustrate execution of a plurality of applications according to an example embodiment;

FIG. 3 illustrates a method of controlling an electronic device according to an example embodiment;

FIG. 5 illustrates a method of controlling an electronic device according to an example embodiment;

FIGS. 9A through 9C illustrate operations of an electronic device according to an example embodiment;

DETAILED DESCRIPTION

Figure 1:
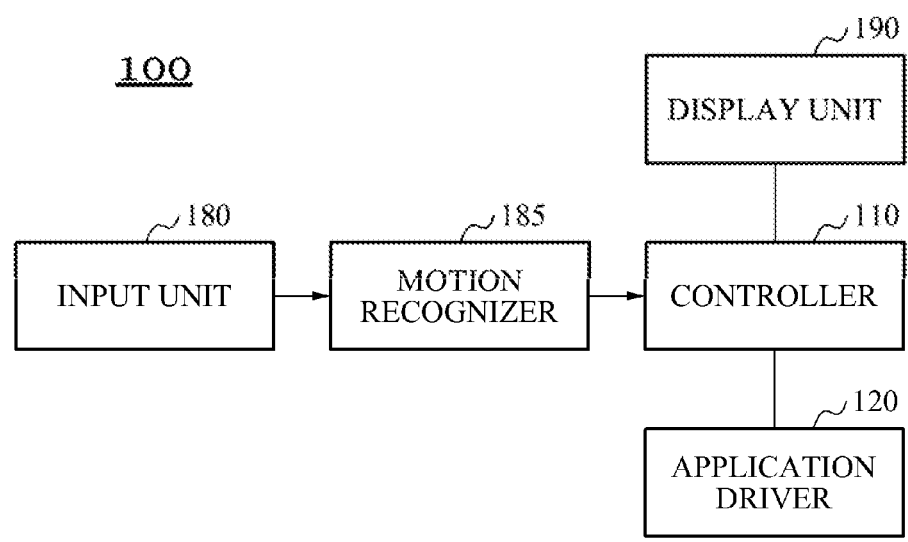
FIG. 1 illustrates an electronic device for executing at least one application according to an example embodiment.

Exemplary embodiments described below are combinations of elements and features of the present invention. The elements or features may be considered selective unless otherwise mentioned. Specific structural and functional details disclosed herein are merely representative for purposes of describing example embodiments. Example embodiments may, however, be embodied in many alternate forms and should not be construed as limited to only the embodiments set forth herein. Each element of feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaces with corresponding constructions of another embodiment.

Accordingly, while example embodiments are capable of various modifications and alternative forms, embodiments thereof are described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order as described. For example, two operations described in succession may in fact be executed substantially concurrently or may sometimes be executed in the reverse order, depending upon the functionality/acts involved.

Reference will now be made in detail to embodiments, examples of which are illustrated in the accompanying drawings, wherein like reference numerals refer to like elements throughout. Example embodiments are described below to explain the present disclosure by referring to the figures.

It should be noted that the terms "touch gesture" and "touch" may be used interchangeably.

FIG. 1 illustrates an electronic device 100 for executing at least one application according to an example embodiment.

Referring to FIG. 1, the electronic device 100 may include a controller 110, an application driver 120, an input unit 180, a motion recognizer 185, and a display unit 190. The electronic device 100 may be referred to as a "client computer", "mobile terminal", "mobile device", "client device", and the like. The electronic device 100 may be any hardware computing device, such as a desktop personal computer (PC), a smart phone, a laptop computer, a digital broadcasting terminal, a video camera, a digital photo camera, an MP3 player, a tablet PC, a portable medial player (PMP), a navigation device, a wearable computing device, and/or any logical device capable of capturing/recording, storing, and/or transferring data.

The controller 110 may include a central processing unit (CPU) and one or more storage devices capable of storing and recording data (not shown) The one or more storage devices may include a read-only memory (ROM) in which a control program to control the electronic device 100, and a random-access memory (RAM) used as a memory space for a task performed or used to store externally input data or signals. The CPU may include a single-core processor, a dual-core processor, a triple-core processor, or a quad-core processor. The CPU, the ROM, and the RAM may be interconnected through an internal bus.

The CPU may be special purpose computer processing device configured to carry out program code stored in one or more storage devices by performing arithmetical, logical, and input/output operations. For example, the control program may be loaded into the CPU. Once the control program is loaded into the CPU, the CPU may be configured to perform control operations for the electronic device 100 according to various example embodiments. The one or more storage devices may be configured to store program code for one or more operating systems and/or program code for one or more software components and/or modules, such as the control program and/or other like modules/units. These software components may also be loaded from a separate computer readable storage medium into the one or more storage devices and/or the one or more processors using a drive mechanism (not shown). Such separate computer readable storage medium may include a USB flash drive, memory stick, Blue-ray/DVD/CD-ROM drive, memory card, and/or other like computer readable storage medium (not shown). In some embodiments, software components may be loaded into the one or more storage devices and/or the CPU from a remote data storage device via a network interface, rather than via a computer readable storage medium.

The application driver 120 may drive at least one application. The controller 110 may control the application driver 120 to drive an application in accordance with an application execution instruction input into the input unit 180. The application driver 120 may drive at least one application stored in one or more storage devices (not shown). The application driver 120 may execute a plurality of applications simultaneously. In various embodiments, the application driver 120 and the controller 110 may be implemented as integrated hardware. In some embodiments, the application driver 120 and the controller 110 may be implemented as separated physical devices.

The input unit 180 may receive an application execution instruction. The input unit 180 may be implemented as a capacitive (C-type) touchscreen, a resistive (R-type) touchscreen, or an electromagnetic resonance (EMR-type) touchscreen. A touchscreen may provide a user with a user interface (UI) corresponding to various services, for example, calling, data transmission, broadcasting, and photographing. The touchscreen may transmit, to the motion recognizer 185, an analog signal corresponding to a touch and/or gesture that is input into the UI. The touchscreen may receive at least one touch through a body part of a user, such as a thumb and/or fingers; or an input device used to input a touch, such as a stylus pen. A "gesture" may refer a combination of one or more touches and/or other like movements, such as tapping, double tapping, long press, pinch open, pinch close, panning flicking, dragging, rotate, two-finger tapping, two-finger-scrolling, and/or other like movements, Additionally, a gesture may include holding a touch and/or movement for a desired period of time, performing a touch and/or movement in a desired position and/or in a desired direction, performing a combination of touches and/or movement in a desired sequence. The touchscreen may transmit, to the motion recognizer 185, an analog signal corresponding to successive movements of a touch and/or gesture being input.

The input unit 180 may receive a multipoint input. The multipoint input may refer to an input including a plurality of points. For example, the multipoint input may correspond to a touch gesture input with respect to at least two points. By way of another example, the multipoint input may correspond to at least two drag gestures or flick gestures starting from at least two points. In this example, the at least two drag gestures may have identical or different directions. In addition, the at least two flick gestures may have identical or different directions. The multipoint input may be configured using a combination of a static input, for example, a touch gesture, and a dynamic input, for example, a drag gesture or a flick gesture. The multipoint input may be differentiated based on a reception pressure and/or an input pressure.

The motion recognizer 185 may recognize information on the multipoint input or the application execution instruction received by the input unit 180 based on an analog signal from the input unit 180. The motion recognizer 185 may recognize input coordinates of the multipoint input. The motion recognizer 185 may recognize a shape formed by the multipoint input and a size of the shape. The motion recognizer 185 may also recognize a pressure of, for example, a touch gesture. The motion recognizer 185 may recognize an input direction of a successive touch, for example, a drag gesture or a flick gesture.

The display unit 190 may display an application execution screen. An application may be executed on a layer. The display unit 190 may display a layer including an application execution screen or a blank layer not including an application execution screen. For example, the display unit 190 and the input unit 180 may be implemented as a touchscreen.

Furthermore, in some embodiments the electronic device 100 may include many more components than those shown in FIG. 1, such as a photographic unit including one or more image sensors, network interface, and/or other like physical hardware components. In some embodiments where the electronic device 100 includes a photographic unit, the photographing unit may be used to photograph a user's gaze, which may be used to recognize a point at which the user's gaze is directed. However, it is not necessary that all of these additional components be shown in order to disclose the example embodiments.

Figure 2A:
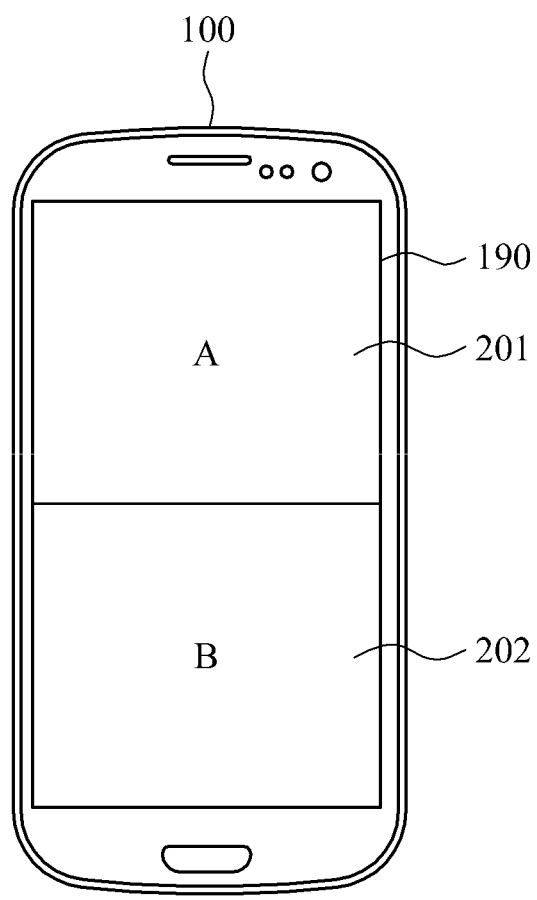

FIGS. 2A and 2B illustrate execution of a plurality of applications according to an example embodiment. As shown in FIGS. 2A-2B, the electronic device 100 includes the display unit 190, which displays a plurality of layers. FIG. 2A illustrates execution of a plurality of applications in a split mode, and FIG. 2B illustrates execution of a plurality of applications in a freestyle mode. The split mode refers to a mode in which a plurality of applications may be displayed to be split in different areas on a main display screen. The freestyle mode refers to a mode in which a plurality of applications may be displayed without restrictions at the same location and thus, the applications may overlap one another.

Referring to FIG. 2A, the electronic device 100 includes a first layer 201 to execute a first application A and a second layer 202 to execute a second application B may be displayed to be split in different areas based on a central boundary line. Although the first layer 201 and the second layer 202 are disposed in upper and lower portions, respectively, such disposition is provided as an example only. According to various embodiments, the first layer 201 and the second layer 202 may be disposed in left and right portions, respectively.

A "layer" may refer to a space and/or region of a display region in which an application may be executed. The layer may correspond to a container including an application execution screen. The layer may also be referred to as a window depending on an operating system (OS) of the electronic device 100. For example, in an Android OS, the layer may be referred to as a window, and a shape and a location thereof may be controlled by a window manager according to the Android OS framework.

The layer may correspond to an area including an application execution screen for a desired (or alternatively, "predetermined") application, a title bar with respect to an application to be executed, and/or a control area with respect to the application to be executed. On each application execution screen, objects associated with the application being executed may be displayed. The objects may be provided in various forms, such as text, a figure, an icon, a button, a checkbox, a photograph, a video, a webpage, a map, and/or other like objects. When an object is touched by a user, a function or a desired event associated with the object may be performed in a corresponding application. In some embodiments, the object may be referred to as a view depending on an OS of the electronic device 100. The title bar may include at least one control key to control a layer display. For example, the control key may include a layer display minimize button, a layer display maximize button, a layer close button, and/or other like layer-related buttons.

Applications refer to programs separately implemented by an application developer and/or a manufacturer of the electronic device 100. Thus, execution of a single application may not require pre-execution of another application. In addition, even when a single application is terminated, an execution of another application may be continued.

Considering that applications are separately implemented programs, the applications may be distinct from multi-function applications or dual applications in which a portion of functions provided by an application is added to another application (e.g., a video application). The functions may include, for example, a memo function, and a message transmission/reception function.

Referring to FIG. 2B, a plurality of layers including layer 211 and layer 212 may be displayed on the display unit 190 of the electronic device 100. The layer 211 and layer 212 may be controlled to be displayed to partially overlap each other. The controller 110 may set display priorities to display the layer 211 and layer 212. For example, the controller 110 may set a first display priority for the layer 211, and set a second display priority for the layer 212. Thus, the controller 110 may display a portion of the layer 212 to be obscured by the layer 211 because layer 211 includes a relatively higher display priority than a display priority of layer 212. A portion of the layer 212 that is overlapped by a portion of the layer 211 may not be displayed or otherwise obfuscated. In various embodiments, a size of the portion of the layer 212 that is overlapped and/or obscured by layer 211 may be based on touch and/or gesture that is input by a user of the electronic device 100.

The controller 110 may set a topmost and/or highest display priority for a window into which a most recent control event is input. For example, when the user of the electronic device 100 touches the layer 211, the controller 110 may set the topmost and/or highest display priority for the touched layer 211.

Although the plurality of layers 211 and 212 partially overlap as exemplarily illustrated in FIG. 2B, the plurality of layers 211 and 212 may be separated from each other and thus, the entire layer screen of both layer 211 and layer 212 may be displayed. Furthermore, although two layers (i.e., layer 211 and layer 212) are shown in FIG. 2B, it should be noted that according to example embodiments three or more layers may be present. In such embodiments, the each layer may have a portion that is overlapped by other layers that have a higher display priority.

FIG. 3 illustrates a method of controlling an electronic device according to an example embodiment. The method of controlling the electronic device, hereinafter also referred to as the controlling method, will be described in detail with reference to FIGS. 4A through 4D. FIGS. 4A through 4D illustrate an operation of electronic device 100 according to example embodiments.

Figure 4A:
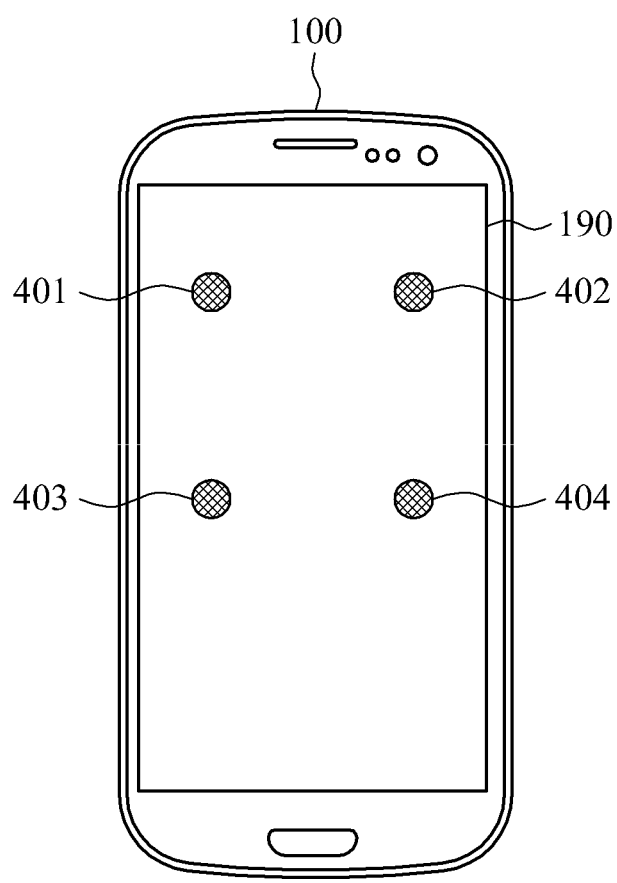
FIGS. 4A through 4D illustrate an operation of an electronic device according to an example embodiment.

In operation 310, the electronic device 100 receives a multipoint input. As shown in FIG. 4A, the electronic device 100 may receive a multipoint input including four touch gestures 401, 402, 403, and 404 (hereinafter referred to as "the four touch gestures 401-404"). The four touch gestures 401-404401-404 may be maintained for at least a preset period of time. The electronic device 100 may detect input points of each of the four touch gestures 401-404401-404.

Figure 4B:
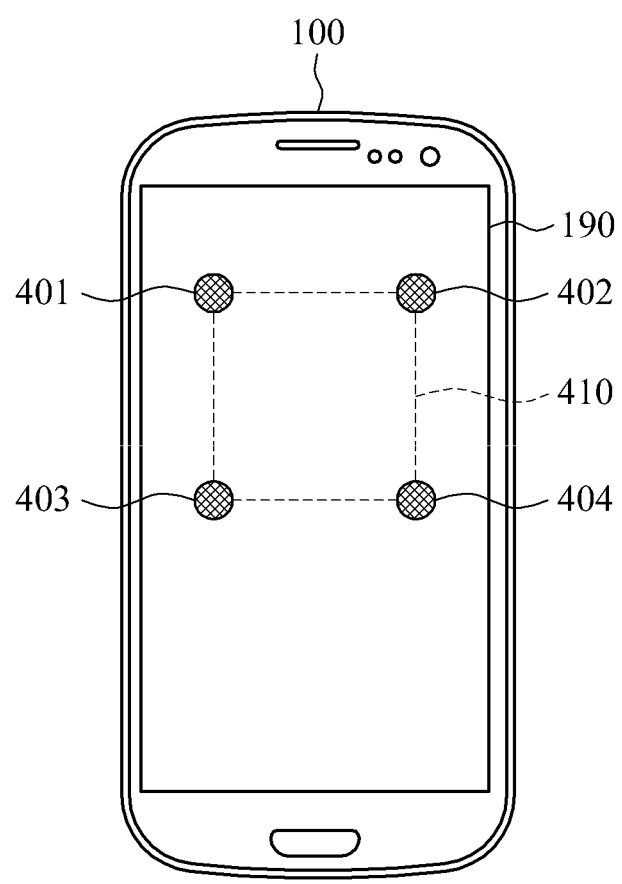

In operation 320, the electronic device 100 detects at least one of a shape formed by the multipoint input, a size of the shape, a number of sub-inputs, an input pressure, and an input direction. As shown in FIG. 4B, the electronic device 100 may detect that a shape 410 formed by the four touch gestures 401-404 corresponds to a quadrilateral. The electronic device 100 may also detect a size of the shape 410 and a position of the shape 410 within the display unit 190. The electronic device 100 may detect a number of sub-inputs of a multipoint input. When the multipoint input corresponds to a successive input, such as a drag gesture, the electronic device 100 may detect an input direction or an input pressure, which will be described in detail later.

In various embodiments, the electronic device 100 may generate and display a "ghost view" or other like preview of a shape to be formed by the multipoint input. The ghost view refers to a preview of a new layer to be generated, and may be displayed with a color or brightness differing from a color or brightness of the display unit 190, which may enable a user of the electronic device 100 to distinguish between the ghost view and the objects and/or applications currently being displayed on the display unit 190.

In operation 330, the electronic device 100 generates a layer corresponding to at least one of the detected shape 410, the size of the detected shape 410, the position of the detected shape 410, the number of the sub-inputs associated with the detected shape 410, the input pressure associated with the four touch gestures 401-404 and/or the sub-inputs of the detected shape 410, and/or the input direction of the detected shape 410.

In operation 350, the electronic device 100 displays an application execution screen. When an application execution instruction is input into the generated layer in operation 340, the application execution screen, or an application execution screen and a layer control area may be displayed on the corresponding layer.

Figure 4C:
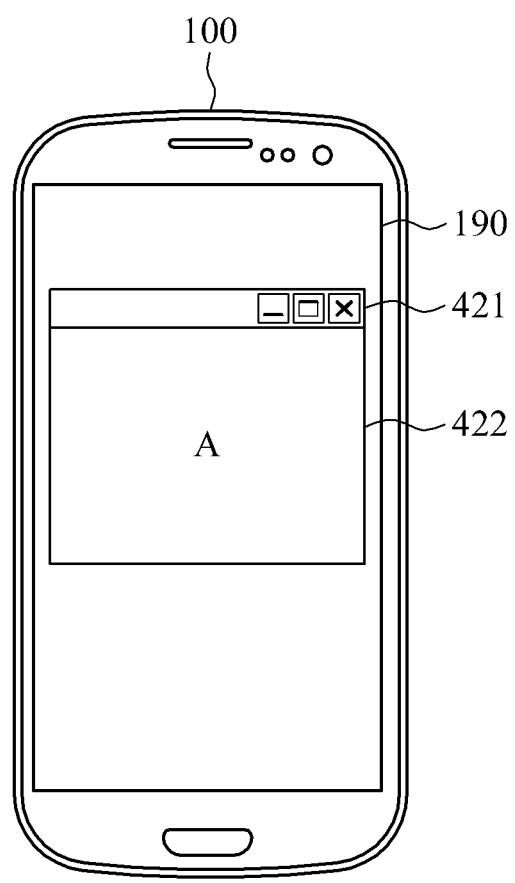

As shown in FIG. 4C, a layer 420 may be generated and displayed on the display unit 190 of the electronic device 100. The layer 420 may be a space in which an application is executed. A layer control area 421 and an application execution screen 422 may be displayed on the layer 420. In another example embodiment, only the application execution screen 422 may be displayed on or within the layer 420.

When a ghost view is generated, a layer having the same or similar size and shape as a ghost view displayed at a point in time at which a layer generation instruction is input may be generated. For example, when a ghost view is generated, a touch release or a change in a pressure of the multipoint input from a first pressure to a second pressure may be set to be a layer generation instruction, and a layer may be generated in accordance with the layer generation instruction.

When an application is not executed, the layer 420 may be displayed to be empty without an application execution screen. In this example, the layer 420 may include a boundary to enable a user to identify a location at which the layer 420 is disposed.

Figure 4D:
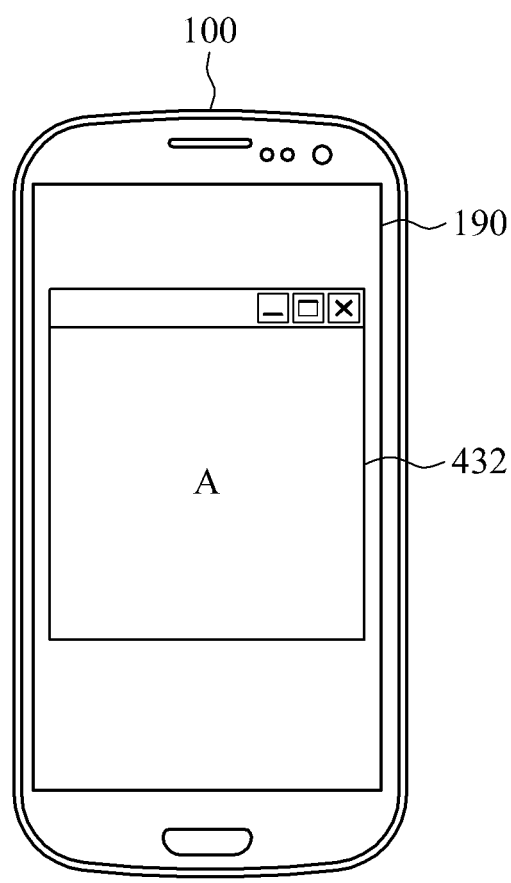

FIG. 4D illustrates generation of a layer 432 in another example embodiment. The controller 110 may generate the layer 432 having a different size based on an input pressure of the multipoint input. For example, when the multipoint input is input with the first pressure, the controller 110 may generate the layer 422 corresponding to the shape formed by the multipoint input, as shown in FIG. 4C. When the multipoint input is input with the second pressure, the controller 110 may generate the layer 432 having a greater size than the shape formed by the multipoint input, as shown in FIG. 4D. The controller 110 may generate the layer 432 having a size enlarged from the size of the shape formed by the multipoint input at a desired (or alternatively, "preset") ratio. The controller 110 may generate a layer differently based on the input pressure of the multipoint input. Although the above example embodiment describes that the controller 110 may generate the layer 432 having a greater size than the shape formed by the multipoint input when the multipoint input is input with the second pressure may be provided, example embodiments are not limited thereto. In some example embodiments, the controller 110 may generate a layer having a smaller size than the shape formed by the multipoint input, may generate a layer having a full screen size, or may generate a layer have a different shape.

As described above, according to various embodiments when a multipoint input is received, at least one of a shape generated based on the multipoint input and a size of the shape may be detected. A layer may be generated based on the detected information, whereby a layer to execute an application may be easily generated at a desired location within the display unit 190.

In various example embodiments, the controlling method may also include entering a layer generation mode in advance or prior to generating the layer. In another example embodiment, a multipoint input may be preset to be a layer generation instruction based on a number of sub-inputs of the multipoint input. For example, in the embodiments of FIGS. 4A through 4D, four touches may be preset to be a layer generation instruction.

FIG. 5 illustrates a method of controlling an electronic device 100 according to an example embodiment.

Referring to FIG. 5, in operation 510, the electronic device 100 receives a successive multipoint input. The multipoint input may include a plurality of sub-point inputs. In a successive multipoint input, a sub-point input may correspond to a spatially successive input from a first point to a second point, such that the second point is input relatively proximate to the first point. The first point and the second point may be determined to be included in the spatially successive input if the second point is input within a desired region of the first point. The successive multipoint input may be detected by the input unit 180. For example, the successive sub-point input may be implemented as a drag gesture, a flick gesture, or any other like gesture. In, some instances, the successive multipoint input, a plurality of successive sub-point inputs may have substantially similar or identical input directions. In some instances, the successive multipoint input, the plurality of successive sub-point inputs may have different input directions.

In operation 520, the electronic device 100 detects an input direction of the successive multipoint input. In operation 530, the electronic device 100 edits a layer based on the detected input direction. Once edited, the electronic device 100 may provide the layer by displaying the layer on the display unit 190 (not shown).

Figure 6A:
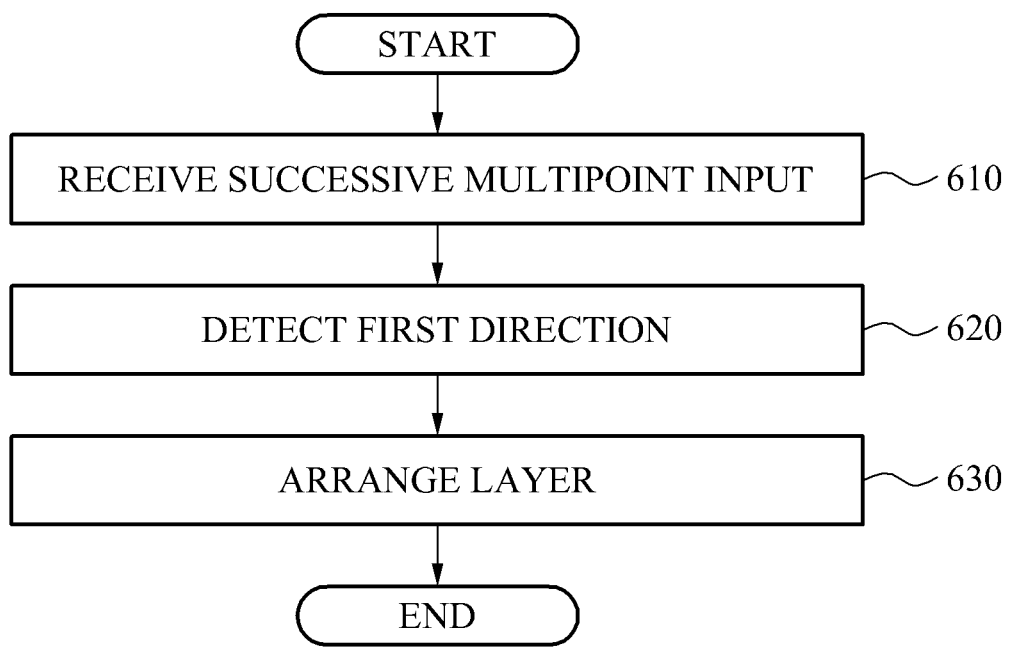
FIGS. 6A and 6B illustrate methods of controlling an electronic device according to an example embodiment.

FIG. 6A illustrates a method of controlling an electronic device 100 according to an example embodiment. The example embodiments of FIG. 6A will be described in detail with reference to FIGS. 7A through 7D. FIGS. 7A through 7D illustrate an operation of electronic device 100 according to example embodiments.

Referring to FIG. 6A, in operation 610, the electronic device 100 receives a successive multipoint input.

Figure 7A:
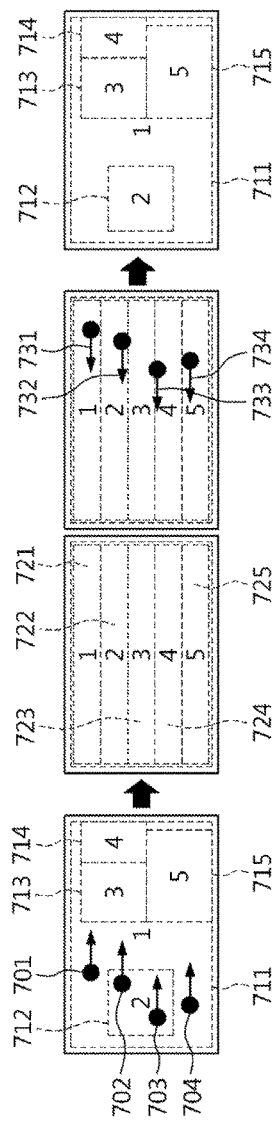
FIGS. 7A through 7D illustrate electronic devices according to an example embodiment.

Referring to FIG. 7A, a successive multipoint input including drag gestures 701, 702, 703, and 704 may be input.

A first layer 711, a second layer 712, a third layer 713, a fourth layer 714, and a fifth layer 715 may be pre-generated and displayed on a display unit. The multipoint input may correspond to, for example, four rightward drag gestures and/or flick gestures. In the example of FIG. 7A, each sub-point input may have a substantially identical direction, that is, a right direction.

In operation 620, the electronic device 100 detects that an input direction of the multipoint input corresponds to a first direction. Referring to FIG. 7A, it may be detected that an input direction of the multipoint input corresponds to a right direction.

In operation 630, the electronic device 100 arranges a layer in the first direction. Referring to FIG. 7A, the controller 110 may control layers 721, 722, 723, 724, and 725 to be arranged and displayed to be extended in a lateral direction and stacked in a vertical direction.

Referring to FIG. 7A, the electronic device 100 may receive a multipoint input including drag gestures 731, 732 733, and 734 in a second direction which is opposite to the first direction. The controller 110 may control at least one layer to be restored and displayed in an initial arrangement thereof based on the multipoint input provided in the second direction. The multipoint input provided in the first direction may correspond to a layer arrangement instruction, and the multipoint input provided in the second direction, which is opposite to the first direction, may correspond to a layer restoration instruction. Thus, a user of the electronic device 100 may control layer arrangement and restoration.

Figure 7B:
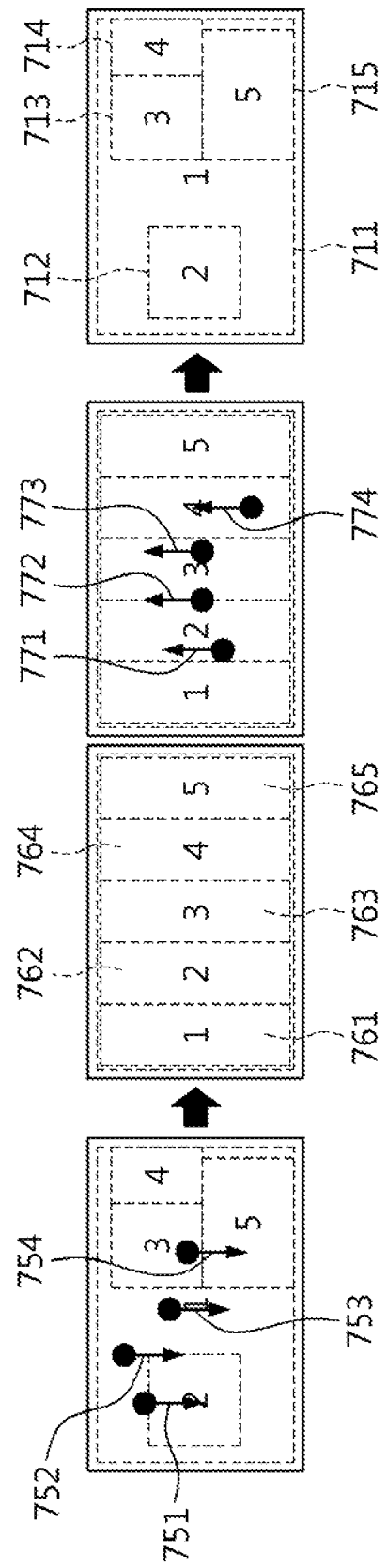
Figure 7C:
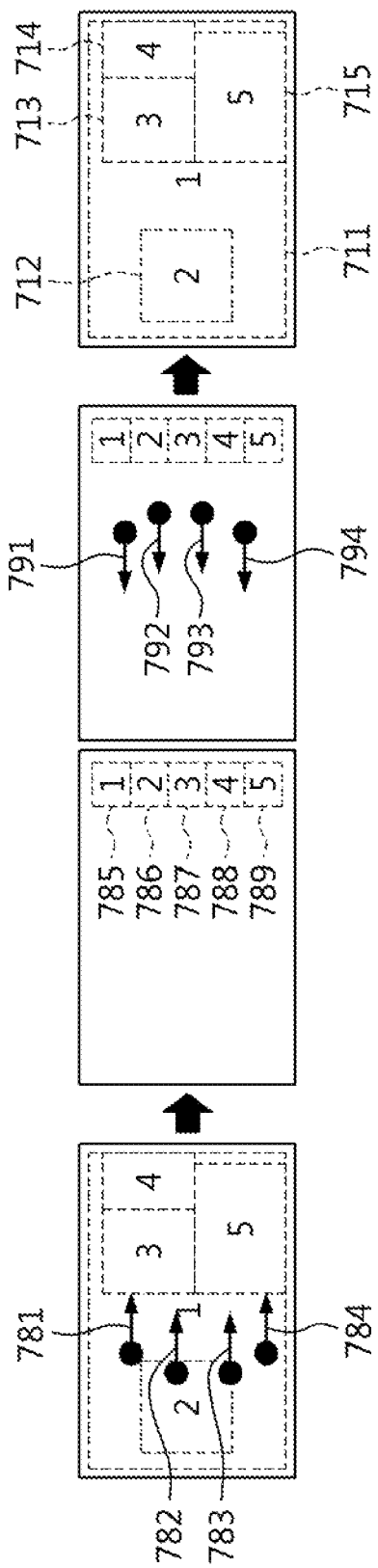
Figure 7D:
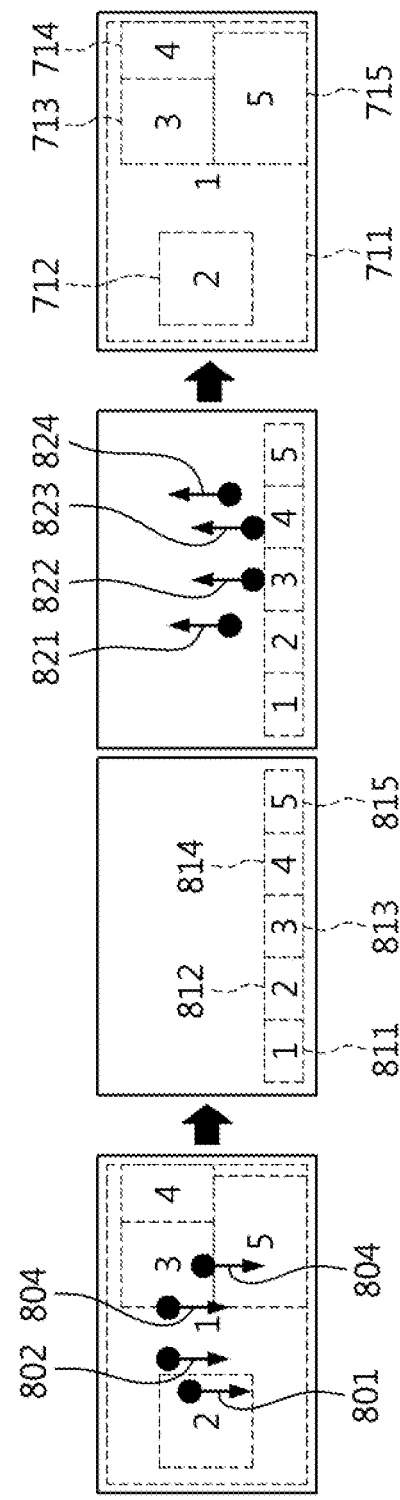

FIGS. 7B through 7D illustrate various methods of arranging layers according to example embodiments.

FIG. 7B illustrates a case in which the first direction described with reference to FIG. 7A is set to a downward direction. As shown in FIG. 7B, when a multipoint input including drag gestures 751, 752, 753, and 754 is input in a downward direction, the controller 110 may control and arrange layers 761, 762, 763, 764, and 765 to be displayed to be extended in a vertical direction and stacked in a lateral direction.

Figure 6B:
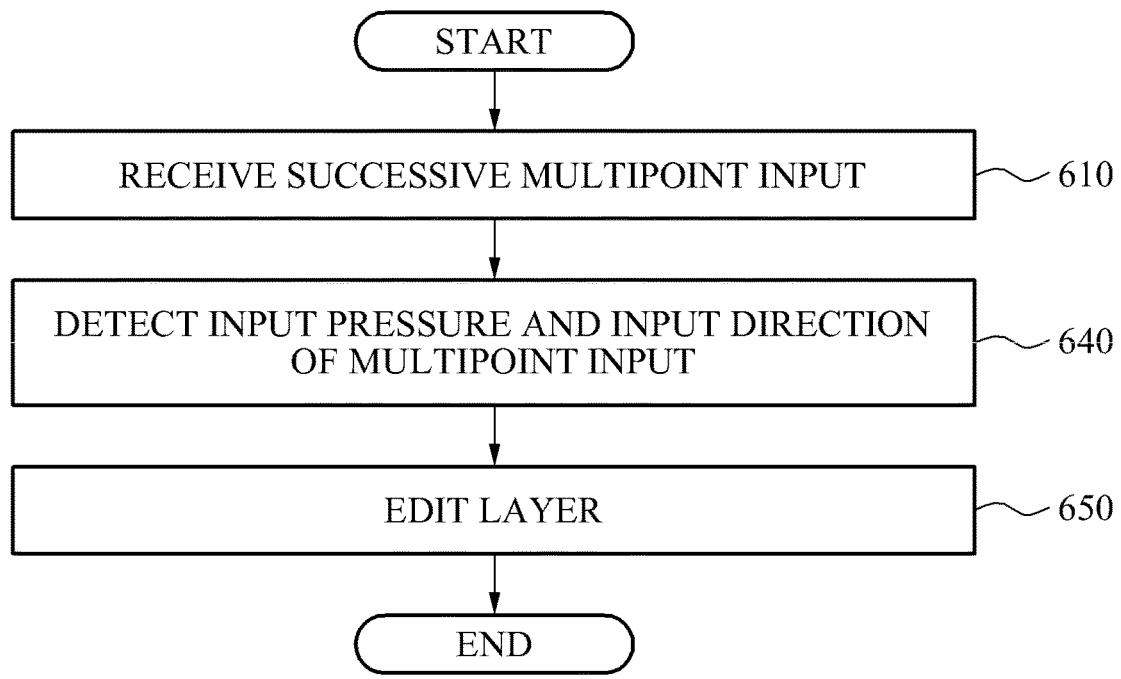

When a layer restoration instruction corresponding to drag gestures 771, 772, 773, and 774 is input in an upward direction, which is opposite to the first direction, the controller 110 may control at least one layer to be restored to and displayed in an initial arrangement thereof FIG. 6B illustrates a method of controlling an electronic device 100 according to an example embodiment.

Referring to FIG. 6B, in operation 610, the electronic device 100 receives a successive multipoint input.

In operation 640, the electronic device 100 detects an input direction and an input pressure of the received multipoint input.

In operation 650, electronic device 100 edits a layer based on the detected input direction and the input pressure of the multipoint input. Once edited, the electronic device 100 may provide the layer by displaying the layer on the display unit 190 (not shown).

For example, the electronic device 100 may arrange at least one layer based on an input direction and a reception pressure of the multipoint input. The electronic device 100 may arrange at least one layer based on the input direction when the reception pressure is detected to be a first pressure. The electronic device 100 may display at least one layer to be contracted when the reception pressure is detected to be a second pressure.

Referring to FIG. 7C, the electronic device 100 may receive a multipoint input including drag gestures 781, 782, 783, and 784. The multipoint input including the drag gestures 781 through 784 may have an input direction identical to that of the multipoint input including the drag gestures 701 through 704 of FIG. 7A, and have a reception pressure differing from that of the multipoint including the drag gestures 701 through 704.

The controller 110 may differentiate the reception pressure of the multipoint input including the drag gestures 781 through 784 from the reception pressure of the multipoint input including the drag gestures 701 through 704. The controller 110 may display layers 785, 786, 787, 788, and 789 to be contracted based on the multipoint input including the drag gestures 781 through 784.

When a layer restoration instruction corresponding to drag gestures 791, 792, 793, and 794 is input in a leftward direction, which is opposite to the first direction, the controller 110 may control at least one layer to be restored and displayed in an initial arrangement thereof. The layer restoration instruction provided in the leftward direction may have a reception pressure identical to or differing from that of the multipoint input including the drag gestures 781 through 784.

FIG. 7D illustrates a case in which the first direction described with reference to FIG. 7C is set to a downward direction. As shown in FIG. 7D, when a multipoint input including drag gestures 801, 802, 803, and 804 is input in a downward direction, the controller 110 may control layers 811, 812, 813, 814, and 815 to be contracted and displayed on a lower side.

Figure 8:
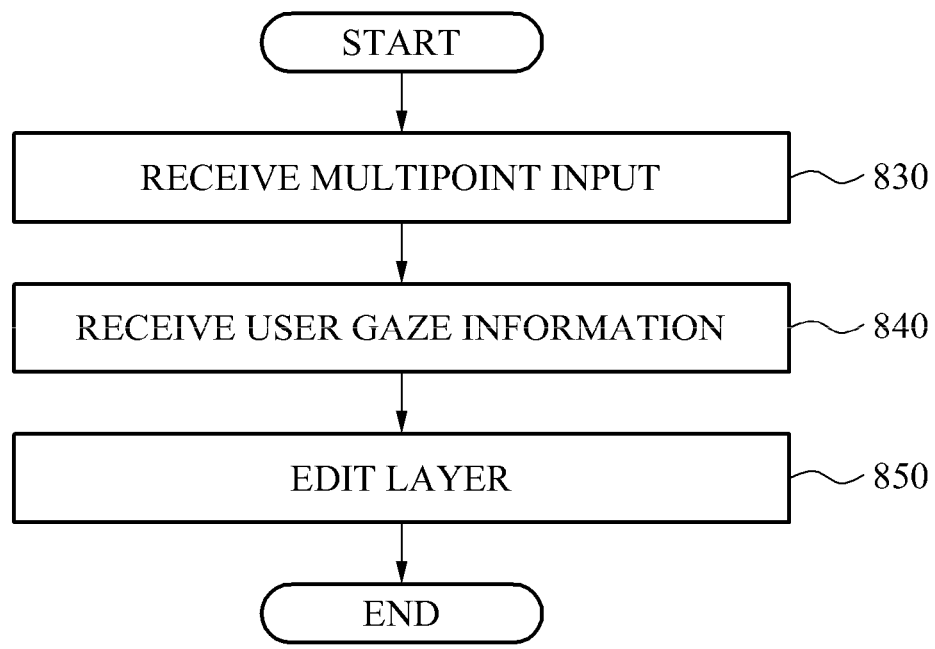
FIG. 8 illustrates a method of editing a layer based on both a multipoint input and user gaze information according to an example embodiment.

When a layer restoration instruction corresponding to drag gestures 821, 822, 823, and 824 is input in an upward direction, which is opposite to the first direction, the controller 110 may control at least one layer to be restored to and displayed in an initial arrangement thereof FIG. 8 illustrates a method of editing a layer based on both a multipoint input and user gaze information according to example embodiments.

Referring to FIG. 8, in operation 830, the electronic device 100 receives a multipoint input.

In operation 840, the electronic device 100 receives user gaze information. For example, a photographing unit may photograph a user gaze, and a gaze recognizer may recognize a point at which the photographed user gaze is directed. As described above, in various embodiments, the photographing unit may include one or more image sensor. In such embodiments, the user's gave may be detected using the one or more image sensors. The gaze recognizer may recognize a point at which the photographed user gaze is directed on the display unit 190.

In various embodiments, the photographing unit may photograph or otherwise detect an image including at least one eye of a user. The photographing unit may output the photographed image to the gaze recognizer. The gaze recognizer may detect an area corresponding to the at least one eye of the user from the image. For example, the gaze recognizer may detect the area corresponding to the eye based on a desired (or alternatively "preset") feature point or color information. The gaze recognizer may detect the user gaze from the area corresponding to the eye and/or a portion within the eye. For example, the gaze recognizer may determine a location of a pupil from the area corresponding to the eye, and recognize the user gaze based on the location of the pupil. The gaze recognizer may recognize the user gaze based on locations and/or positions of the pupils, and/or may also recognize the user gaze based on a desired (or alternatively "preset") algorithm. In some embodiments the photographing unit may photograph or otherwise detect an image including at least one facial feature of a user, such as a region surrounding or near an eye, an eyebrow, and/or other like facial feature. In such embodiments, the gaze recognizer may recognize the user gaze based on location and/or position of the facial feature(s), and may also recognize the user gaze based on a desired algorithm.

In operation 850, the electronic device 100 edits a layer based on the multipoint input and the user gaze information. Once edited, the electronic device 100 may provide the layer by displaying the layer on the display unit 190 (not shown).

Hereinafter, various examples of editing a layer based on a multipoint input and user gaze information will be described.

FIGS. 9A through 9C illustrate operations of electronic device 100 according to example embodiments.

Referring to FIG. 9A, a first layer 901, a second layer 902, and a third layer 903 may be generated and displayed in the display unit 190. A first application may be executed and a first application execution screen may be displayed in the second layer 902. An application may not be executed in the third layer 903, and thus, the third layer 903 may remain empty.

In an example embodiment, a multipoint input including two touches 904 and 905 may be input into the second layer 902. The controller 110 may receive a recognition result that a user gaze 906 is directed at the third layer 903. The controller 110 may control an application executed on a layer into which a multipoint input is received to be executed on a layer at which a user gaze is directed. A multipoint input with respect to a single layer and a user gaze input with respect to another layer may be set to be an application copy instruction.

The controller 110 may determine coordinates of the display unit 190 at which the user gaze is directed. The controller 110 may identify a layer corresponding to the coordinates of the display unit 190 at which the user gaze is directed. When a plurality of layers corresponds to the coordinates of the display unit 190, the controller 110 may determine an uppermost layer to be a layer at which the user gaze is directed. The controller 110 may control an application executed on a layer into which a multipoint input is received to be executed on a layer at which a user gaze is directed.

Although the application executed on the layer into which the multipoint input is received may be executed on the layer at which the user gaze is directed in the example embodiments as shown in FIG. 9A, a configuration in which an application executed in a layer at which a user gaze is directed may be executed in a layer into which a multipoint input is received may also be possible.

Referring to FIG. 9B, a first layer 911 and a second layer 912 may be generated and displayed on the display unit 190. A first application may be executed and a first application execution screen may be displayed on the second layer 912.

The controller 110 may receive a recognition result that a user gaze 913 is directed at the second layer 912.

A multipoint input including four touches 914, 915, 916, and 917 forming a shape 918 of a quadrilateral may be input. The controller 110 may generate a new layer 919 at a point at which a multipoint input is received, based on a shape and a size of the multipoint input. The controller 110 may execute the first application in the new layer 919.

Referring to FIG. 9C, a first layer 921, a second layer 922, a third layer 933, and a fourth layer 924 may be generated and displayed in the display unit 190. The third layer 923 may have a higher display priority than the fourth layer 924. Thus, the third layer 923 may be displayed and a portion of the fourth layer 924 may not be displayed. The portion of the fourth layer 924 that is not displayed may be a portion in which the third layer 923 overlaps the fourth layer 924.

The controller 110 may receive a recognition result that a user gaze 925 is directed to the fourth layer 924. A multipoint input including three drag gestures 931, 932, and 933 may be received by an input unit 180.

The controller 110 may control the fourth layer 924 at which the user gaze 925 is directed to be displayed, and remaining layers may not be displayed.

As described above, example embodiments of the controlling methods may include editing layers based on both a multipoint input and a user gaze, and thus, a user may intuitively edit layers.

Figure 10:
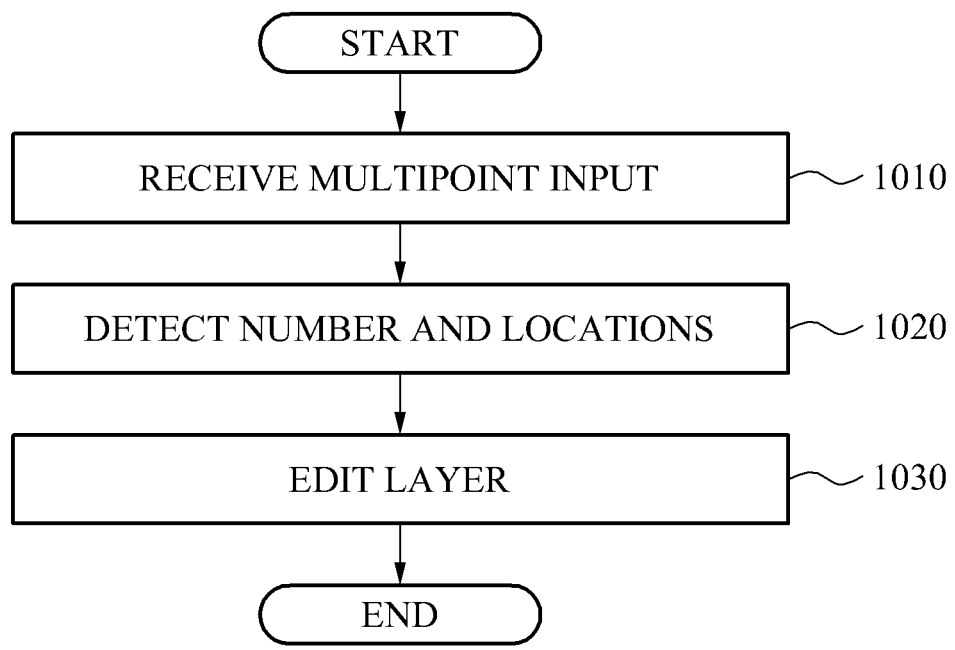
FIG. 10 illustrates a method of editing a layer based on a number and locations of input points of a multipoint input according to an example embodiment.

FIG. 10 illustrates a method of editing a layer based on a number and locations of input points of a multipoint input according to an example embodiment.

Referring to FIG. 10, in operation 1010, the electronic device 100 receives a multipoint input.

In operation 1020, the electronic device 100 detects a number and locations of sub-point inputs of the multipoint input.

In operation 1030, the electronic device 100 edits a layer based on the detected number and locations of the sub-point inputs.

Figure 11A:
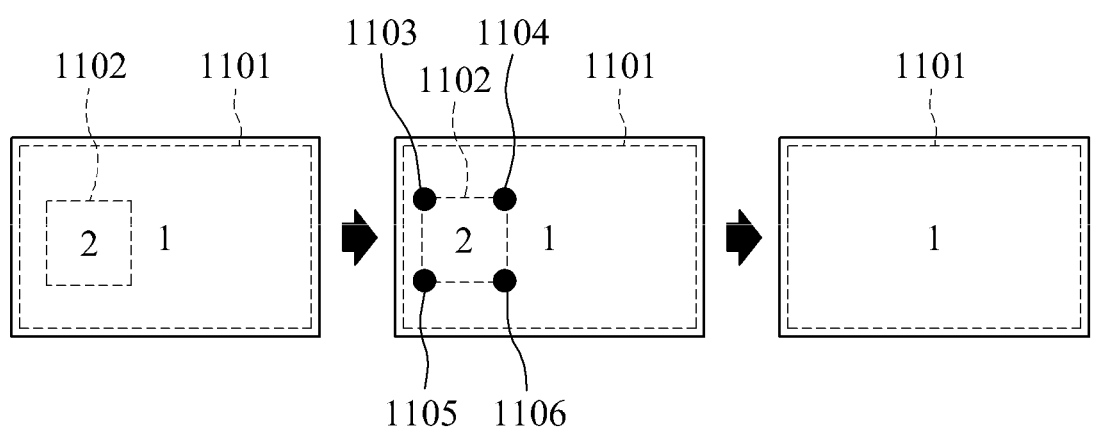
FIGS. 11A through 11C illustrate operations of an electronic device that edits a layer based on a number and locations of input points of a multipoint input according to an example embodiment.

Referring to FIG. 11A, a first layer 1101 and a second layer 1102 may be pre-generated and displayed in the display unit 190. A multipoint input including four touch gestures 1103, 1104, 1105, and 1106 may be received on a boundary of the second layer 1102.

The controller 110 may verify or otherwise determine that a number of the touch gestures, for example, sub-point inputs input into the second layer 1102 corresponds to "4" and locations at which the four touch gestures are input correspond to the second layer 1102. The four touch gestures may be preset to be a layer generation instruction in a case in which a layer is absent, and may be a layer deletion instruction in a case in which a layer is present.

The controller 110 may delete the second layer 1102 based on the received multipoint input.

Figure 11B:
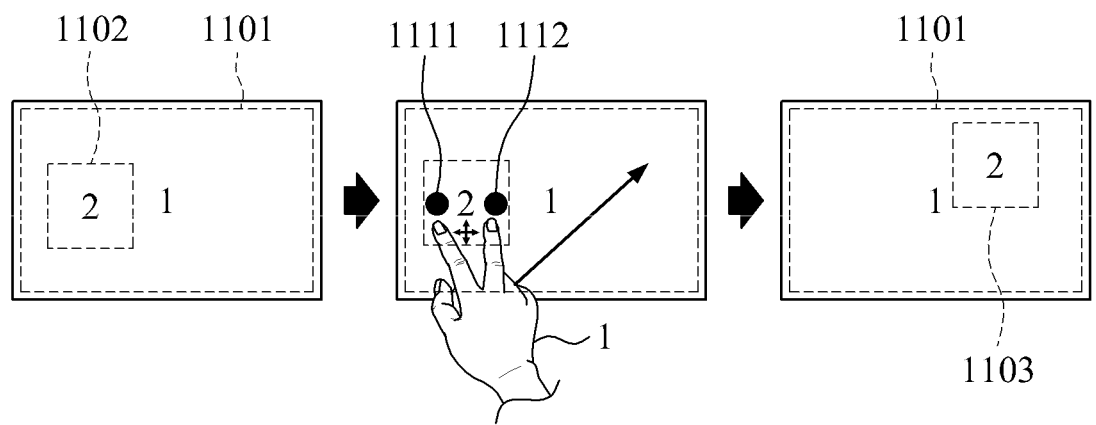

Referring to FIG. 11B, the first layer 1101 and the second layer 1102 may be generated and displayed in the display unit 190. A multipoint input including two drag or flick gestures 1111 and 1112 may be received on the boundary of the second layer 1102.

The controller 110 may verify or otherwise determine that a number of the drag or flick gestures, for example, sub-point inputs input into the second layer 1102 corresponds to "2" and locations at which the two drag or flick gestures are input correspond to an upper right side from the second layer 1102. The two drag or flick gestures may be a layer reposition instruction.

The controller 110 may control a repositioned second layer 1103 to be displayed based on the received multipoint input.

Figure 11C:
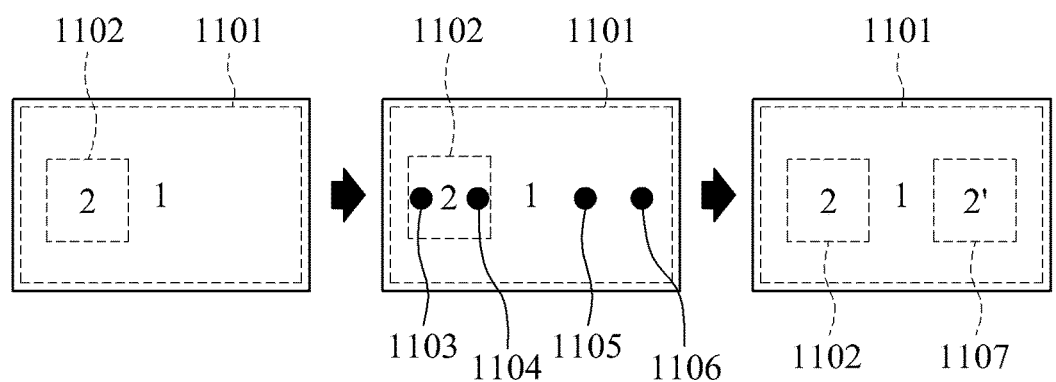

Referring to FIG. 11C, the first layer 1101 and the second layer 1102 may be generated and displayed in the display unit 190. A multipoint input including four gestures 1123, 1124, 1125, and 1126 may be input. Among the four gestures 1123, 1124, 1125, and 1126, two gestures 1123 and 1124 may be input inside the second layer 1102, and the other two gestures 1125 and 1126 may be input outside the second layer 1102.

The controller 110 may verify or otherwise determined that a number of touch gestures, for example, sub-point inputs input inside the second layer 1102, corresponds to "2", and a number of touch gestures, for example, sub-point inputs input outside the second layer 1102, corresponds to "2". The two touch gestures provided internally and the two touch gestures provided externally may be preset to be a layer copy instruction.

The controller 110 may control a third layer 1107 to be generated and displayed based on the received multipoint input. The controller 110 may control an application executed on the second layer 1102 to be executed on the third layer 1107.

As described above, according to various embodiments layers may be edited in various forms based on a number of sub-point inputs of a multipoint input. Thus, a user may intuitively edit layers.

Figure 12A:
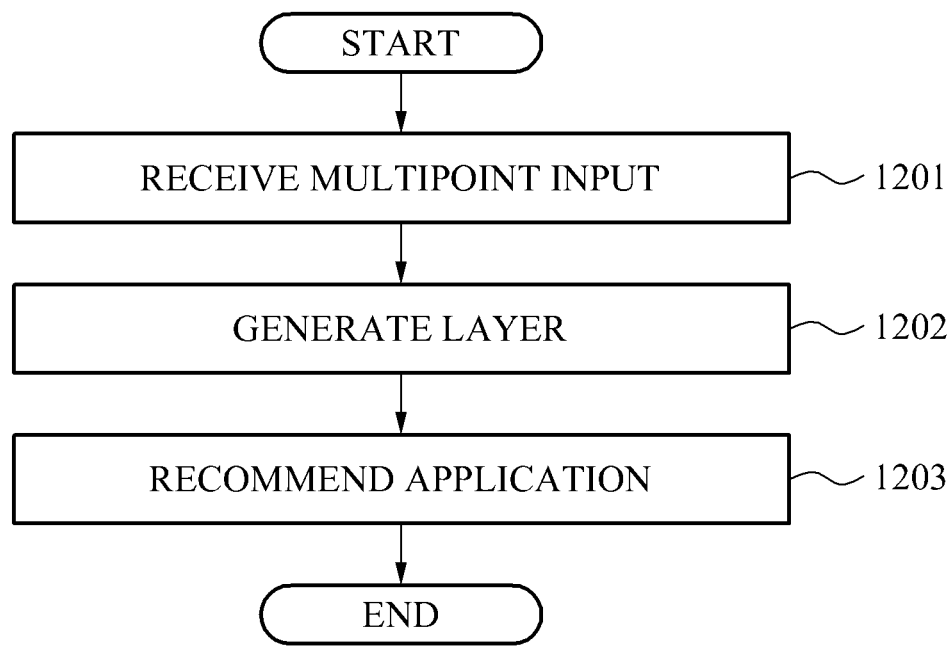
FIGS. 12A through 12C illustrate methods of recommending an application according to an example embodiment.
Figure 12B:
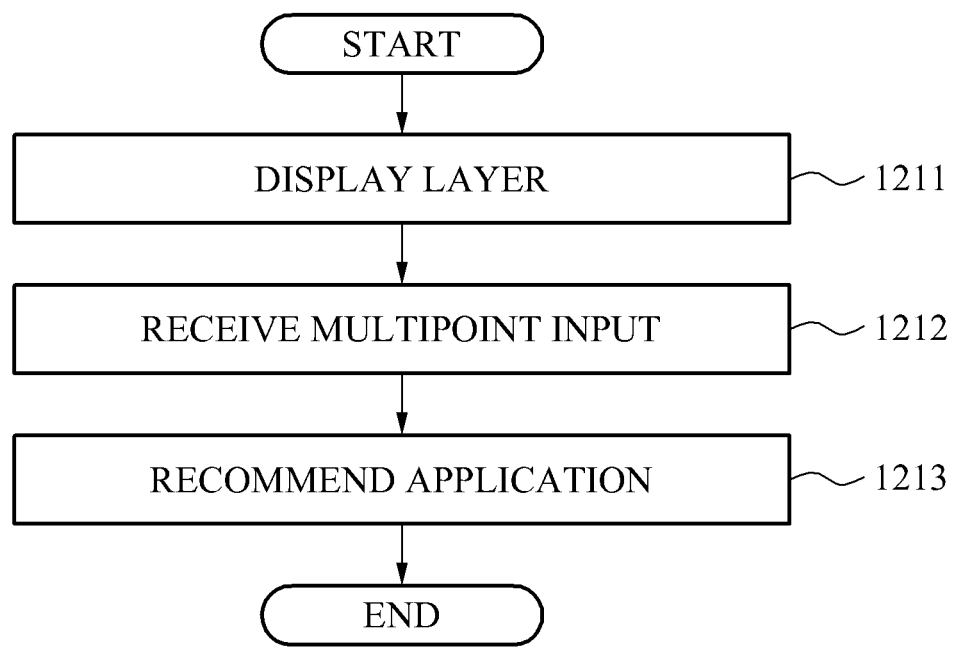
Figure 12C:
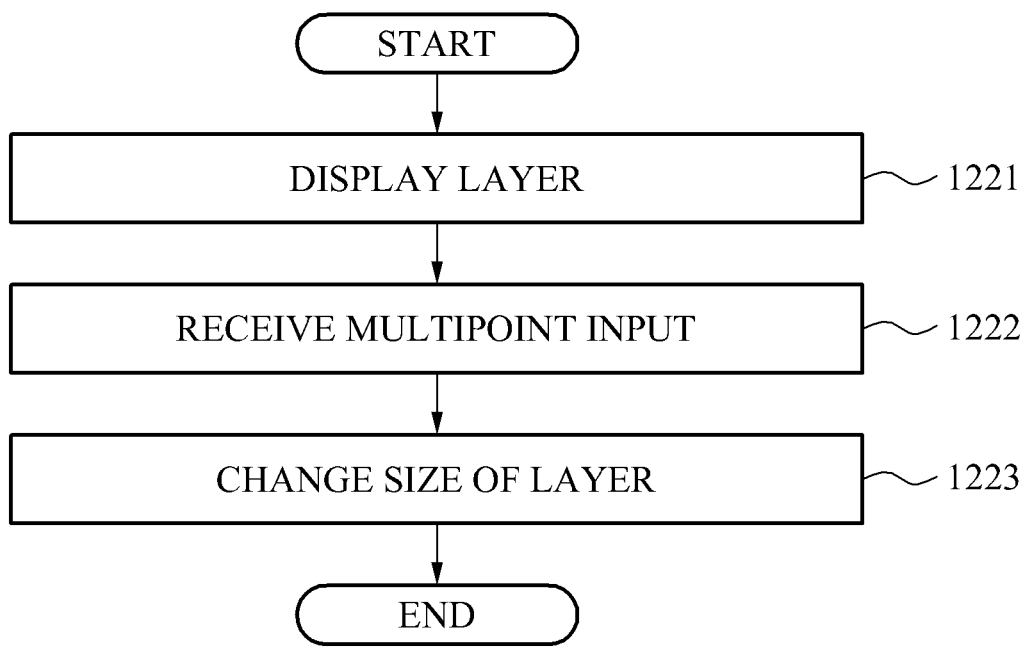

FIGS. 12A through 12C illustrate methods of recommending an application according to example embodiments.

Referring to FIG. 12A, in operation 1201, the electronic device 100 receives a multipoint input.

In operation 1202, the electronic device 100 generates a layer based on the multipoint input. For example, the electronic device 100 may generate a new layer, as described with reference to FIG. 3.

In operation 1203, the electronic device 100 recommends an application executable on the new layer based on at least one of a shape and a size of the generated layer.

Referring to FIG. 12B, in operation 1211, the electronic device 100 displays the layer. An application may not be executed on the displayed layer and thus, the layer may remain empty.

In operation 1212, the electronic device 100 receives a multipoint input inside or outside the layer, for example, in a vicinity of the layer. In operation 1213, the electronic device 100 recommends an application suitable to be executed in the layer. For example, the electronic device 100 may recommend an application suitable to be executed in the layer based on at least one of a size of the layer, a shape of the layer, and/or an aspect ratio of the layer.

Referring to FIG. 12C, in operation 1221, the electronic device 100 displays a layer. In operation 1222, the electronic device 100 receives a multipoint input outside the layer. In operation 1223, the electronic device 100 changes a size of the layer based on the multipoint input.

FIGS. 13A through 13D illustrate screenshots of recommended applications according to example embodiments.

Figure 13A:
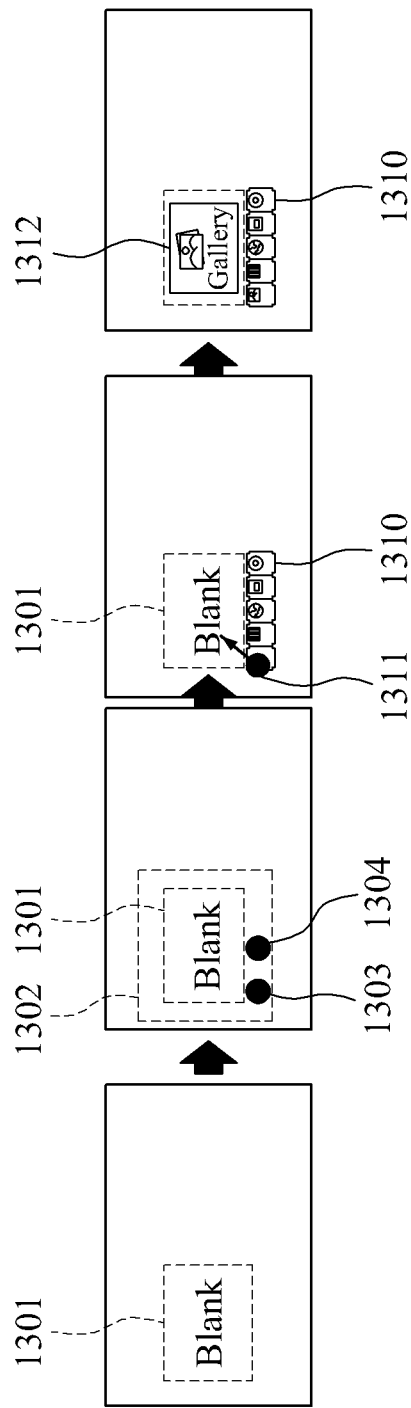
FIGS. 13A through 13D illustrate screenshots of recommended applications according to an example embodiment.

Referring to FIG. 13A, an empty layer 1301 may be displayed since an application is not executed. A multipoint input including two touch gestures 1303 and 1304 may be received in a vicinity 1302 of the layer 1301.

The controller 110 may control an application recommendation window 1310 to be displayed based on the multipoint input. The application recommendation window 1310 may include applications suitable to be executed in the layer 1301. A user may select one of the applications in the application recommendation window 1310. Based on the user selection, the controller 110 may control the selected application to be executed in a layer, and an application execution screen 1312 to be displayed. An empty layer 1311 may be displayed at a top end of the application recommendation window 1310.

Figure 13B:
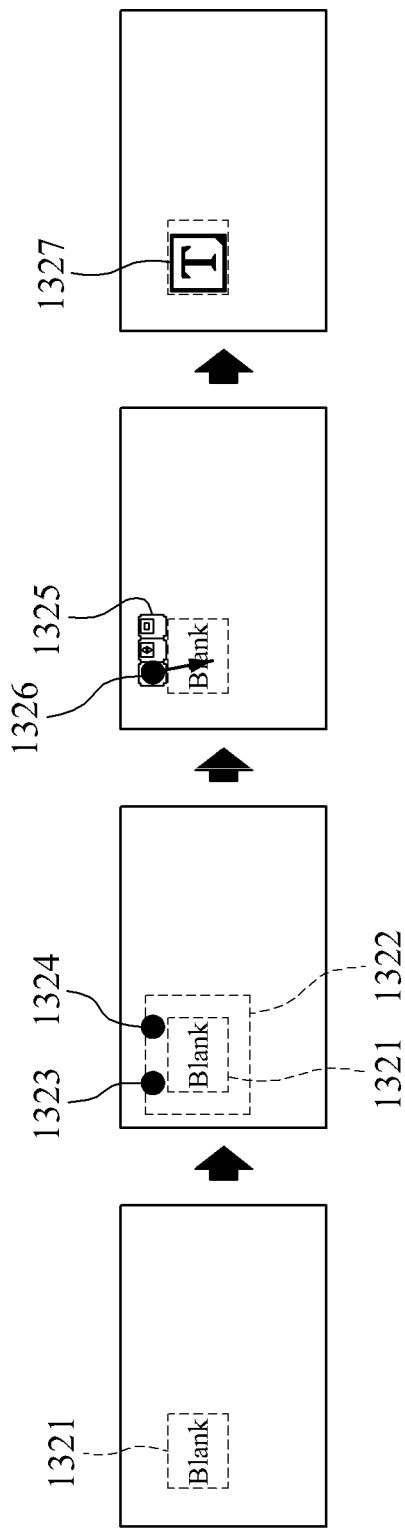

Referring to FIG. 13B, a multipoint input including touch gestures 1323 and 1324 may be received in a vicinity 1322 of a relatively small layer 1321. The controller 110 may control an application recommendation window 1325 to be displayed. The application recommendation window 1325 may include applications suitable to be executed on a relatively small layer. The controller 110 may control an application execution screen 1327 to be displayed in accordance with an application execution instruction 1326.

Figure 13C:
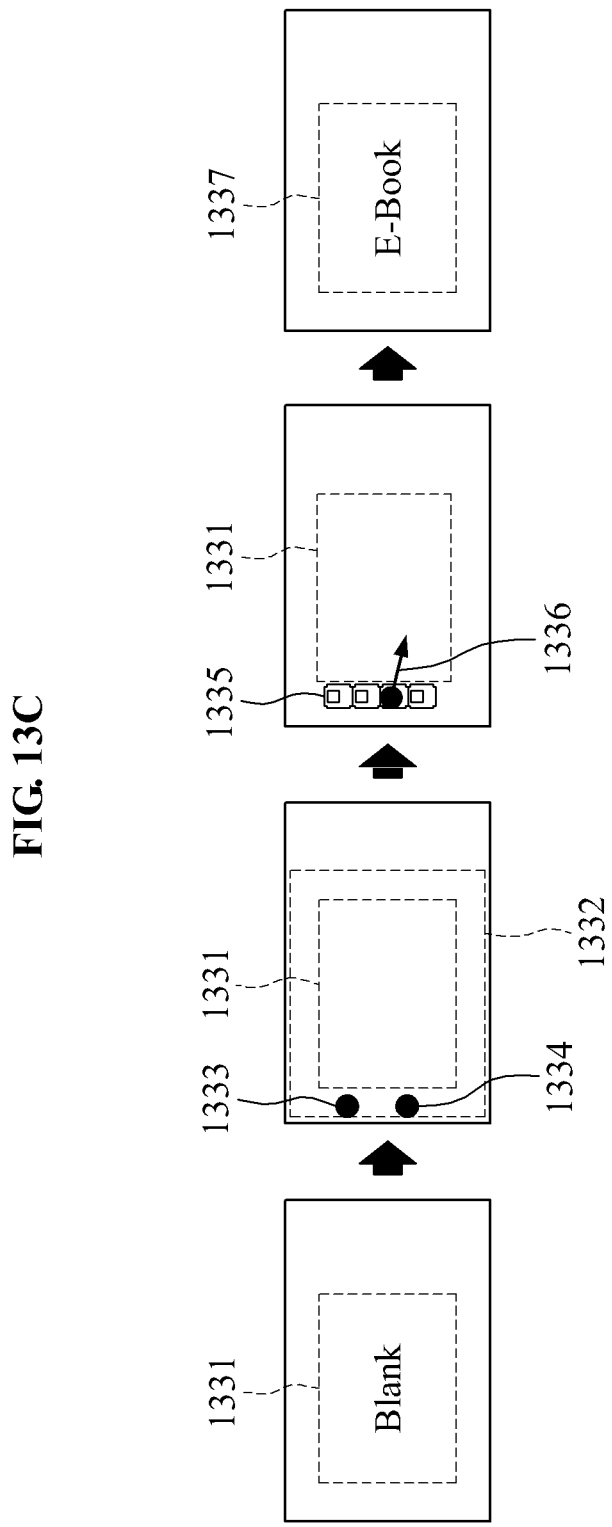

Referring to FIG. 13C, a multipoint input including touch gestures 1333 and 1334 may be received in a vicinity 1332 of a relatively large layer 1331. The controller 110 may control an application recommendation window 1335 to be displayed. The application recommendation window 1335 may include applications suitable to be executed in a relatively large layer. In addition, the controller 110 may control an application execution screen 1337 to be displayed in accordance with an application execution instruction 1336.

Figure 13D:
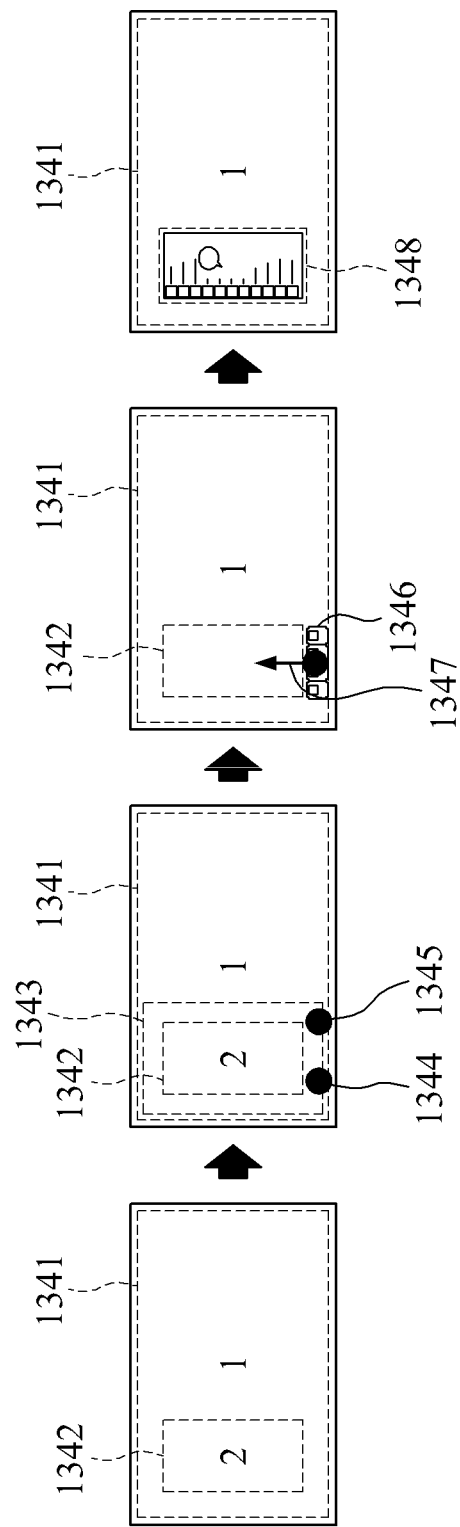

Referring to FIG. 13D, a multipoint input including two touch gestures 1344 and 1345 may be received in a vicinity 1343 of a layer 1342 having a relatively greater height than width. The layer 1342 may be displayed above a layer 1341. The controller 110 may control an application recommendation window 1346 to be displayed. The application recommendation window 1346 may include applications suitable to be executed in a layer having a relatively greater height than width. In addition, the controller 110 may control an application execution screen 1348 to be displayed in accordance with an application execution instruction 1347.

Figure 14:
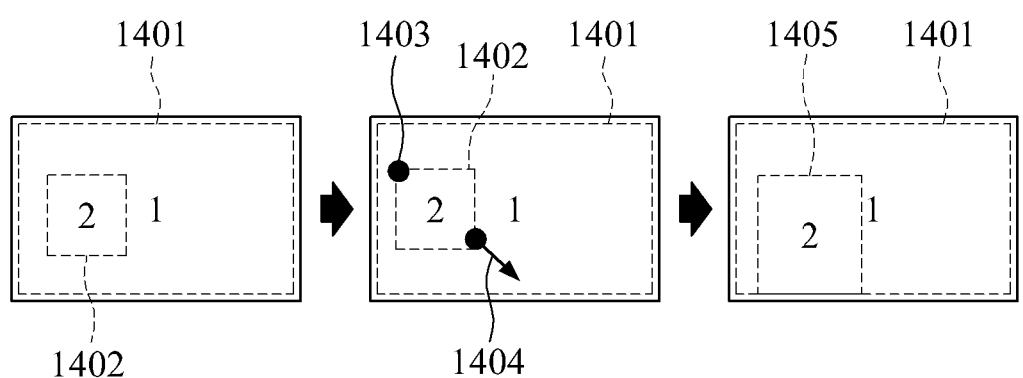
FIG. 14 illustrates an operation of changing a size of a layer according to an example embodiment.

FIG. 14 illustrates an operation of changing a size of a layer according to an example embodiment.

Referring to FIG. 14, a first layer 1401 and a second layer 1402 may be displayed in the display unit 190 of the electronic device 100. The electronic device 100 may receive a multipoint input including a single touch gesture 1403 and a single drag gesture 1404.

The controller 110 may control a size of the second layer 1402 to be changed based on the multipoint input. The controller 110 may control the size of the second layer 1402 to be changed based on an input point of the touch gesture 1403 and an input direction of the drag gesture 1404. In FIG. 4, a resized second layer 1405 may be displayed.

Figure 15:
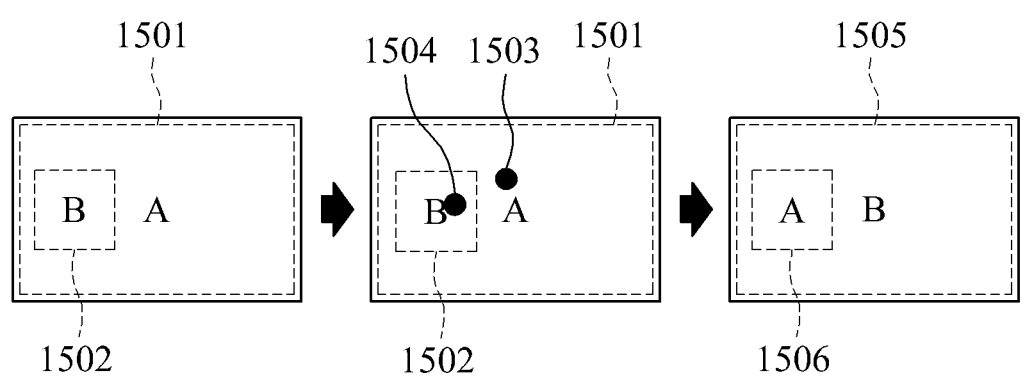
FIG. 15 illustrates an operation of exchanging applications executed on layers according to an example embodiment.

FIG. 15 illustrates an operation of exchanging applications executed on layers according to an example embodiment.

Referring to FIG. 15, a first layer 1501 and a second layer 1502 may be displayed in the display unit 190 of the electronic device 100. A first application A may be executed on the first layer 1501 and a second application B may be executed on the second layer 1502. The electronic device 100 may receive a multipoint input including a touch gesture 1503 and a touch gesture 1504. The touch gesture 1503 may be input into the first layer 1501, and the touch gesture 1504 may be input into the second layer 1502.

The controller 110 may control the second application B to be executed on a first layer 1505 and the first application A to be executed on a second layer 1506 based on the multipoint input.

Figure 16A:
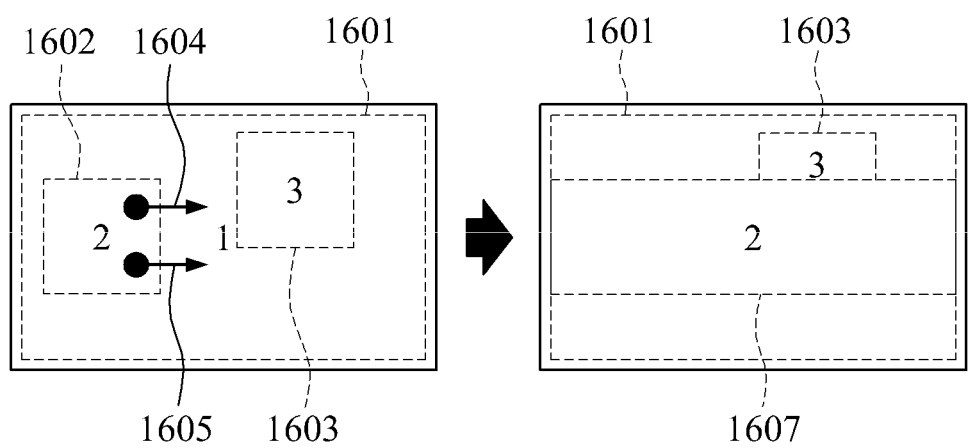
FIGS. 16A through 16C illustrate operations of changing a size of a layer according to an example embodiment.
Figure 16B:
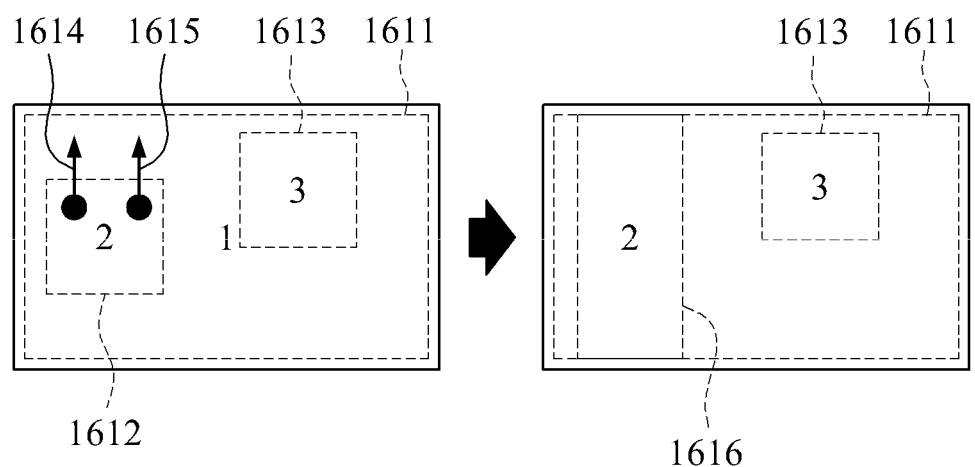
Figure 16C:
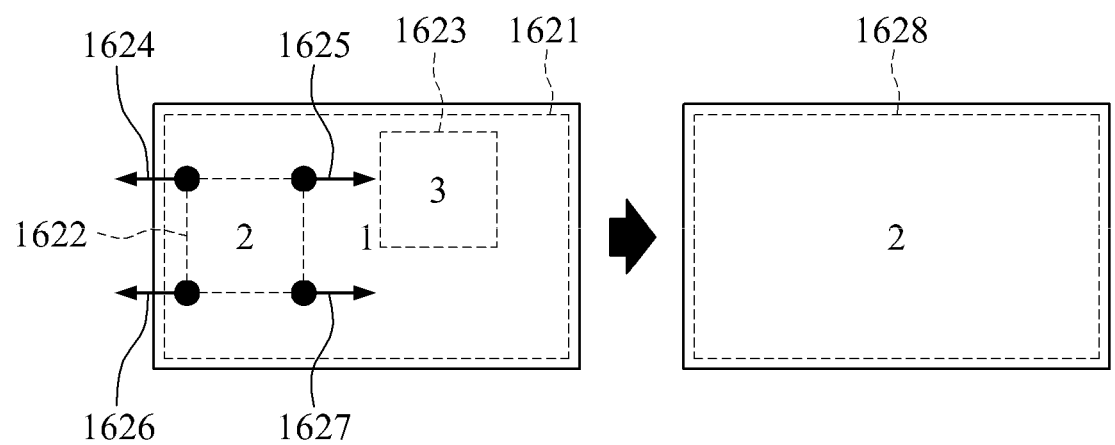

FIGS. 16A through 16C illustrate operations of changing a size of a layer according to example embodiments.

Referring to FIG. 16A, a first layer 1601, a second layer 1602, and a third layer 1603 may be displayed in the display unit 190 of the electronic device 100. The electronic device 100 may receive a multipoint input including two drag gestures 1604 and 1605.

The controller 110 may control a size of a second layer 1607 to be changed based on the multipoint input. The controller 110 may detect an input direction of the multipoint input, and control the size of the second layer 1607 to be changed in the detected direction. In the example of FIG. 16A, a rightward multipoint input may be received, and the controller 110 may control the laterally extended second layer 1607 to be displayed based on the received multipoint input.

Referring to FIG. 16B, a first layer 1611, a second layer 1612, and a third layer 1613 may be displayed in the display unit 190 of the electronic device 100. A multipoint input including two drag gestures 1614 and 1615 may be received in an upward direction. The two drag gestures 1614 and 1615 may be received inside the second layer 1612. The controller 110 may control the vertically extended second layer 1616 to be displayed based on the received multipoint input.

Referring to FIG. 16C, a first layer 1621, a second layer 1622, and a third layer 1623 may be displayed in the display unit 190 of the electronic device 100. The electronic device 100 may receive a multipoint input including four drag gestures 1624, 1625, 1626, and 1627.

The controller 110 may control a size of a second layer 1628 to be changed based on the multipoint input. The controller 110 may detect a number of sub-point inputs of the multipoint input, and control the size of the second layer 1628 to be changed based on the detected number of the sub-point inputs of the multipoint input. In the example of FIG. 16C, a multipoint input including four sub-points may be received, and the controller 110 may control the extended second layer 1628 having a full screen size to be displayed based on the received multipoint input.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling an electronic device that executes at least one application, the method comprising:
   receiving, by the electronic device, a first multipoint input on a touchscreen of the electronic device, the first multipoint input being a gesture input received at a plurality of points;
   detecting, by the electronic device, input points of the first multipoint input;
   generating, by the electronic device, a first layer on the touchscreen to execute a first application, the first layer being a layer generated based on the detected input, points of the first multipoint input; and
   editing, by the electronic device, the first layer based on sub point inputs of the first multipoint input and a relation between the first layer and a second layer, the second layer being a layer at which a user's gaze is directed based on user gaze information among at least one layer on the touchscreen,
   wherein the generating includes generating the first layer based on at least one of input coordinates, a shape, a size of the shape, a pressure, or an input direction recognized from the first multipoint input, and
   wherein the editing includes at least one of copying, repositioning, deleting, changing a size and controlling execution of the first application with respect to the first layer.

2. The method of claim 1, wherein the detecting comprises:
   detecting at least one of (i) a shape formed by the input points of the first multipoint input and (ii) a size of the shape.

3. The method of claim 2, wherein the editing comprises:
editing the first layer to execute the first application based on the detecting; and
displaying a new layer based on the editing.

4. The method of claim 3, wherein the editing comprises:
displaying a new layer with a boundary, the boundary being based on the input points of the first multipoint input.

5. The method of claim 3, wherein the editing comprises:
displaying a ghost view for previewing a shape of a new layer with a boundary, the boundary being based on the input points of the first multipoint input;
receiving an instruction to generate the new layer; and
displaying the new layer corresponding to the ghost view when the instruction to generate the new layer is input.

6. The method of claim 5, further comprising:
displaying the ghost view when the first multipoint input is maintained; and
generating the new layer corresponding to the ghost view when at least one of (i) the first multipoint input is completed, (ii) a pressure of the first multipoint input is changed, and (iii) the pressure of the first multipoint input is changed from a first pressure to a second pressure.

7. The method of claim 3, further comprising:
receiving an instruction to execute the first application in the new layer; and
executing the first application in the new layer in accordance with the instruction.

8. The method of claim 7, further comprising:
providing a recommendation for executing at least one application in the new layer, based on at least one of (i) an application type of the at least one application, (ii) a shape of the new layer, (iii) a size of the new layer, and (iv) an aspect ratio of the new layer.

9. The method of claim 1, wherein the electronic device includes at least one existing layer currently being displayed by the electronic device, and the editing includes deleting the at least one existing layer.

10. The method of claim 9, further comprising:
receiving the first multipoint input on or within a boundary of the at least one existing layer; and
deleting the at least one existing layer corresponding to the first multipoint input.

11. The method of claim 1, wherein the electronic device includes at least one existing, layer currently being displayed by the electronic device, and the generating comprises:
changing at least one of (i) a location and (ii) a size of the at least one existing layer.

12. The method of claim 1, further comprising:
receiving a multipoint input in the first layer for executing the first application;
receiving a second multipoint input;
generating a third layer for executing the first application at a receiving location of the second multipoint input; and
providing the third layer including executing the first application within the third layer.

13. The method of claim 1, further comprising:
receiving a first sub-multipoint input while a multipoint input for executing the first application is being received in the first layer;
receiving a second sub-multipoint input while another multipoint input for executing a second application is being received in a third layer;
executing the second application in the first layer; and
executing the first application in the third layer.

14. The method of claim 1, further comprising:
receiving a spatially successive input, the spatially successive input being a multipoint input including a plurality of input points that are relatively proximate to one another;
detecting an input direction of the spatially successive input; and
editing the first layer based on the input direction of the spatially successive input.

15. The method of claim 1, further comprising:
detecting the user's gaze;
determining a direction of the user's gaze; and
editing the first layer based on the input points of the first multipoint input and the direction of the user's gaze.

16. The method of claim 15, further comprising:
executing the first application in the second layer when (i) the input points of the first multipoint input correspond to an instruction to execute the first application in the layer and (ii) the direction of the user's gaze corresponds to the second layer.

17. The method of claim 15, further comprising:
generating a third layer and
executing the first application in the third layer based on the first multipoint input when the direction of the user's gaze corresponds to the first layer and the input points of the first multipoint input correspond to an area that does not include a layer.

18. The method of claim 15, further comprising:
displaying the first layer when the direction of the user's gaze corresponds to the first layer and the first multipoint input corresponds to a flick gesture.

19. The method of claim 1, further comprising:
detecting an input pressure of the first multipoint input; and
editing the first layer based on the detected input pressure.

20. An electronic device for executing at least one application, the electronic device comprising:
an input unit configured to receive a multipoint input on a touchscreen of the electronic device, the multipoint input being a gesture input received at a plurality of points;
a motion recognizer configured to detect input points of the multipoint input; and
a controller configured to generate a first layer on the touchscreen for executing the at least one application based on the detected input points of the multipoint input, the controller further configured to generate the first layer based on at least one of input coordinates, a shape, a size of the shape, a pressure, or an input direction recognized from the multipoint input, the controller further configured to edit the first layer based on sub point inputs of the first multipoint input and a relation between the first layer and a second layer,
wherein the second layer is a layer at which a user's gaze is directed based on a user gaze information among at least one layer on the touchscreen.

* * * * *